(12) United States Patent
Ono et al.

(10) Patent No.: US 10,844,776 B2
(45) Date of Patent: Nov. 24, 2020

(54) CONTROLLER AND CONTROL METHOD FOR INTERNAL COMBUSTION ENGINE

(71) Applicant: Mitsubishi Electric Corporation, Tokyo (JP)

(72) Inventors: Takahiko Ono, Hyogo (JP); Tatsuhiko Takahashi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 587 days.

(21) Appl. No.: 15/689,006

(22) Filed: Aug. 29, 2017

(65) Prior Publication Data
US 2018/0298810 A1    Oct. 18, 2018

(30) Foreign Application Priority Data

Apr. 17, 2017  (JP) .................. 2017-081068

(51) Int. Cl.
*F02B 37/18* (2006.01)
*F02B 37/007* (2006.01)
(Continued)

(52) U.S. Cl.
CPC ............ *F02B 37/18* (2013.01); *F02B 37/007* (2013.01); *F02D 41/0007* (2013.01);
(Continued)

(58) Field of Classification Search
CPC ...... F02B 37/18; F02B 37/183; F02B 37/186; Y02T 10/146; Y02T 10/144; F02D 41/0007; F02D 41/20; F02D 41/2464
(Continued)

(56) References Cited

U.S. PATENT DOCUMENTS

| | | | | |
|---|---|---|---|---|
| 4,709,553 A | * | 12/1987 | Ueno | F02B 37/18 60/602 |
| 5,850,738 A | * | 12/1998 | Hayashi | F02B 37/18 60/602 |

(Continued)

FOREIGN PATENT DOCUMENTS

| | | | |
|---|---|---|---|
| JP | 08074588 A | * | 3/1996 |
| JP | 2015-166571 A | | 9/2015 |
| JP | 6038271 B1 | | 12/2016 |

*Primary Examiner* — Hoang M Nguyen
(74) *Attorney, Agent, or Firm* — Sughrue Mion, PLLC; Richard C. Turner

(57) ABSTRACT

To provide controller and control method for internal combustion engine that can suppress motor built in actuator from overheating when waste gate valve is controlled to near fully closed position or fully opened position, and can suppress from causing deterioration of fuel efficiency by consuming large power wastefully even in light load operation region in which pressure of exhaust gas is low relatively. A controller for internal combustion engine calculates basic operating amount for bringing real opening degree close to target opening degree; calculates an operating amount obtained by performing upper limitation of basic operating amount by first limit value, as final operating amount, in case of supercharging driving state; and calculates an operating amount obtained by performing upper limitation of basic operating amount by second limit value smaller than first limit value, as final operating amount, in case of non-supercharging driving state.

7 Claims, 9 Drawing Sheets

(51) Int. Cl.
*F02D 41/00* (2006.01)
*F02D 23/00* (2006.01)
*F02B 37/12* (2006.01)
*F02D 41/24* (2006.01)

(52) U.S. Cl.
CPC ........ *F02B 2037/122* (2013.01); *F02D 23/00* (2013.01); *F02D 41/2464* (2013.01); *F02D 2200/04* (2013.01); *F02D 2200/0402* (2013.01); *F02D 2200/0406* (2013.01); *F02D 2250/16* (2013.01); *Y02T 10/144* (2013.01)

(58) Field of Classification Search
USPC ........................................ 60/602, 605.1–612
See application file for complete search history.

(56) References Cited

U.S. PATENT DOCUMENTS

| | | | |
|---|---|---|---|
| 2014/0137552 A1* | 5/2014 | Yokono | F02B 37/18 60/600 |
| 2014/0202137 A1* | 7/2014 | Takahashi | F02D 41/0007 60/286 |
| 2017/0184012 A1* | 6/2017 | Maruo | F02B 37/186 |
| 2018/0328269 A1* | 11/2018 | Aoyagi | F02D 41/20 |

* cited by examiner

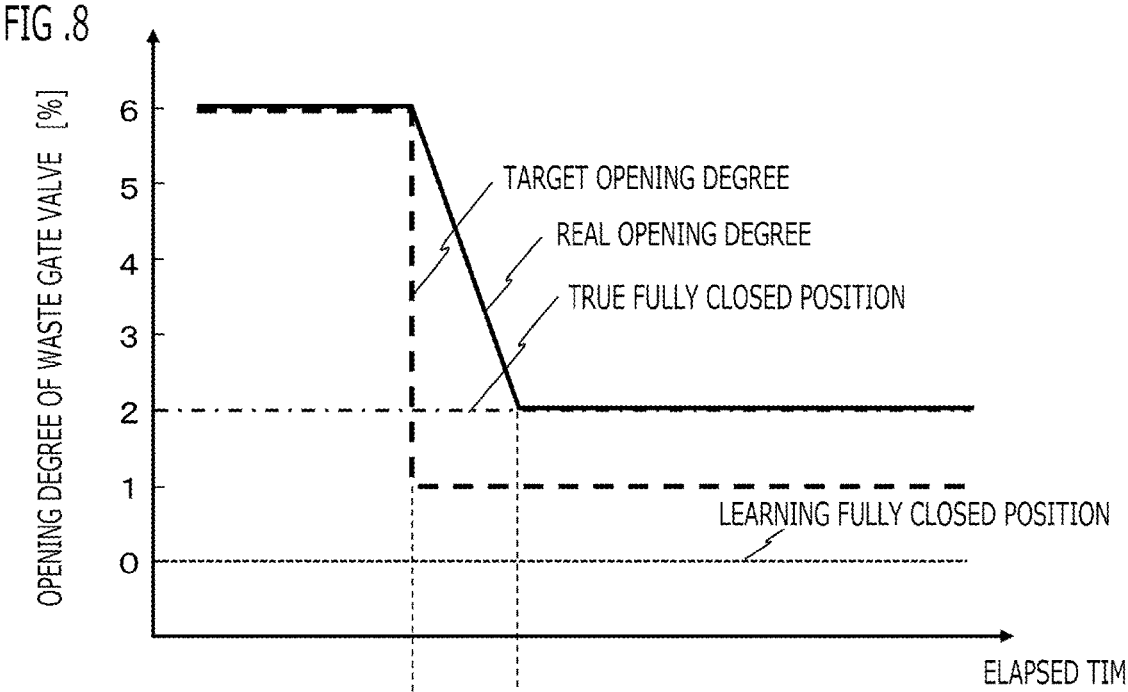
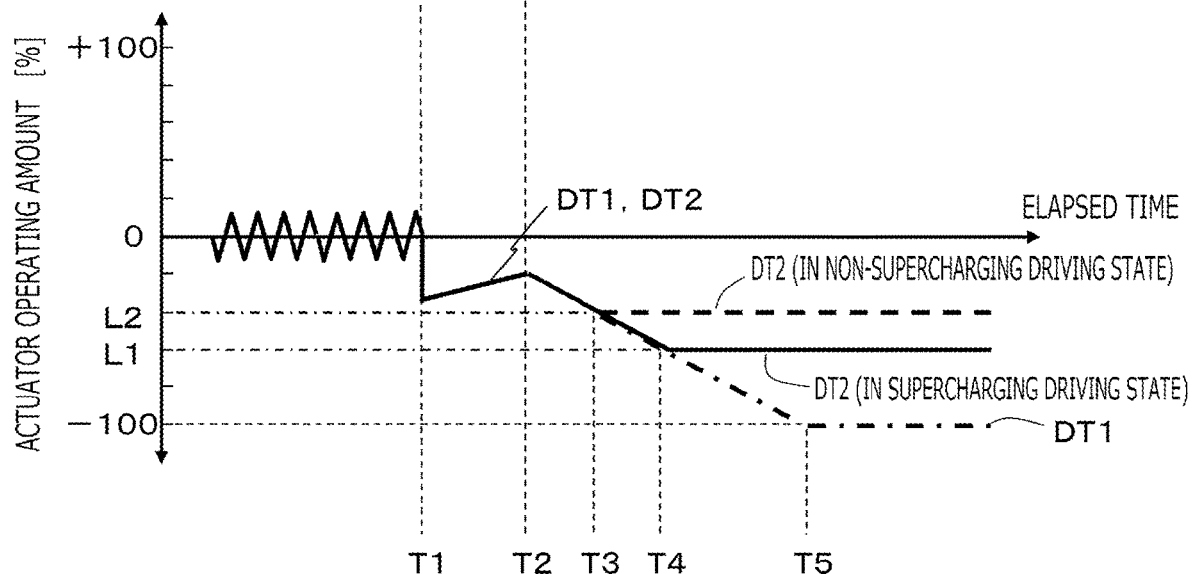
FIG. 8

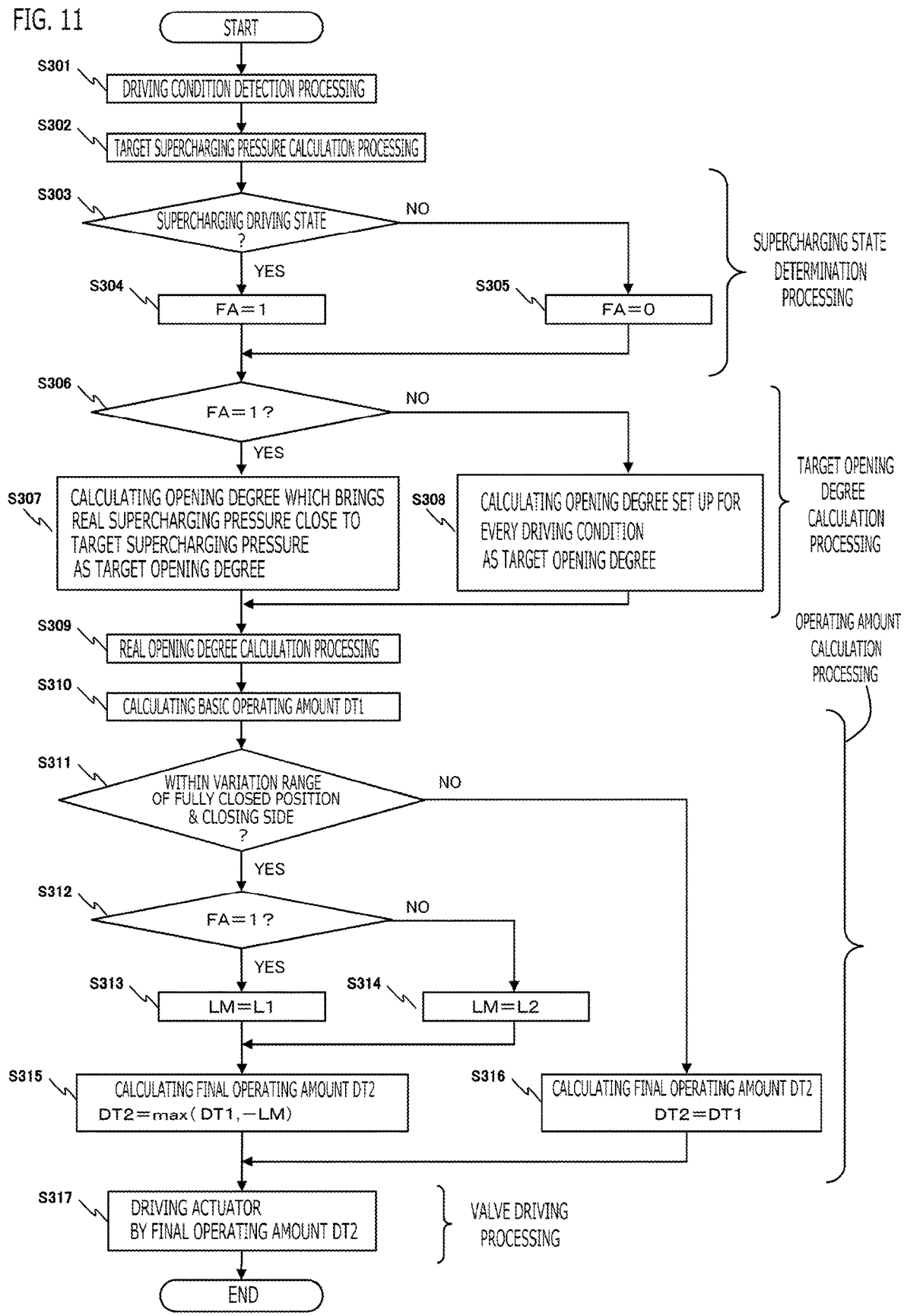

CONTROLLER AND CONTROL METHOD FOR INTERNAL COMBUSTION ENGINE

INCORPORATION BY REFERENCE

The disclosure of Japanese Patent Application No. 2017-081068 filed on Apr. 17, 2017 including its specification, claims and drawings, is incorporated herein by reference in its entirety.

BACKGROUND

This invention relates to a controller and control method for an internal combustion engine provided with a turbocharger which adjusts an opening degree of a waste gate valve by an electromotive actuator.

To date, the internal combustion engine provided with the supercharger, such as the turbocharger, for the purpose of the output improvement of the internal combustion engine is put in practical use. The turbocharger compresses the intake air supplied to the internal combustion engine by rotating the turbine using the energy of the exhaust gas discharged from the internal combustion engine and driving the compressor connected with the turbine.

In the internal combustion engine which mounts the turbocharger, when the pressure (hereinafter, referred to the supercharging pressure) of the intake air compressed by the compressor increases more than necessary at the time of operating the internal combustion engine in high rotation speed and high load, there is a possibility of damaging the internal combustion engine. Therefore, usually, the exhaust gas bypass is provided in parallel with the turbine. Then, the waste gate valve is provided in the exhaust gas bypass; by changing the opening degree of this waste gate valve, the flow rate of the exhaust gas which flows through the exhaust gas bypass is adjusted; as a result, the flow rate of the exhaust gas which flows into the turbine is adjusted, the driving force of the compressor changes, and the supercharging pressure is controlled.

The controller for the internal combustion engine which mounts the turbocharger calculates the target opening degree for realizing the desired supercharging pressure according to the driving condition of the internal combustion engine, and controls the actuator so that the real opening degree of the waste gate valve, which is calculated based on the operating position of the waste gate valve detected by the position sensor, approaches the target opening degree.

However, the fully closed position of the waste gate valve deviates from the design value, by various factors, such as a deviation of the attachment position at the time of attaching the waste gate valve to the exhaust gas bypass, a drift of the output voltage by a temperature characteristic of the position sensor, and a thermal expansion of turbocharger member. Therefore, usually, there has been adopted the full close learning control that learns, as the true fully closed position, the output voltage of the position sensor at the time of controlling to the state where the waste gate valve butts against the fully closed position (the state where the waste gate valve fully closes the exhaust gas bypass). The full close learning control prevents deterioration of the calculation accuracy of the waste gate valve opening degree.

As a method to learn the fully closed position, for example, in Japanese Patent Unexamined Application Publication No. 2015-166571 (JP 2015-166571 A), there has been proposed the method for learning, as the true fully closed position, the output voltage of the position sensor at the time when the operating amount of the actuator sticks to the maximum value, since it became the state where the waste gate valve butted against the true fully closed position by implementing the butting control that makes the waste gate valve move toward the close side by feedback control until the waste gate valve butts against the fully closed position.

SUMMARY

However, as JP 2015-166571 A, when the operating amount of the actuator is increased to the maximum value while the waste gate valve butts against the fully closed position, the driving force of the actuator may exceed the rigidity of the connection member which configures the linkage mechanism connecting the waste gate valve and the actuator, and large bending may be caused in the connection member.

In this way, if the fully closed position is learned in the state where the connection member was bent, after completing learning of the fully closed position, when the target opening degree is set to the fully closed position or slightly open side of the fully closed position, since it is controlled to coincide the waste gate valve opening degree with the target opening degree while bending the connection member, the actuator operating amount increases to the maximum or near the maximum similarly to during performing of the full close learning control.

Therefore, by the full close learning method proposed in JP 2015-166571 A, when the target opening degree is set to the fully closed position or slightly open side of the fully closed position, the operating amount of the actuator increases and it causes deterioration of fuel efficiency by consuming large power wastefully, and it is worried that in the worst case, the motor built in the actuator overheats and breaks down by overheating by excessive energization.

Even if there is employed the connection member with high rigidity which is not bent by the maximum driving force of the actuator, after completing the full close learning, for example, in the state where the turbocharger member expands thermally by transition to the high load operation of the internal combustion engine and the fully closed position rises, when the target opening degree is set to the fully closed position or slightly open side of the fully closed position, the waste gate valve butts against the true fully closed position before reaching the target opening degree, also in this case, in order to coincide the waste gate valve with the target opening degree by feedback control, the actuator operating amount increases to the maximum or near the maximum, it causes deterioration of fuel efficiency by consuming large power wastefully, and it is worried that in the worst case, the motor built in the actuator overheats and breaks down by overheating by excessive energization.

To the anxiety of JP 2015-166571 A described above, for example, as disclosed in Japanese Examined Patent Publication No. 6038271 (JP 6038271 B), there is the countermeasure method of limiting the maximum value of actuator operating amount by the limit value which is preliminarily set as operating amount which does not damage the actuator even if energization of the actuator continues for more than the predetermined period, when the opening degree of the waste gate valve is below the predetermined value. Accordingly, even if actuator operating amount becomes excessive because the waste gate valve butts against the true fully closed position before reaching the target opening degree, the motor built in the actuator can be prevented from overheating and breaking down.

However, in order to control the waste gate valve to the fully closed position, since it is necessary to prevent the close failure which occurs by pushing back with the exhaust gas pressure, it is necessary to press the waste gate valve to the fully closed position by an actuator driving force which resists the maximum pressure of the exhaust gas. Therefore, as the limit value of the actuator operating amount in JP 6038271 B, even in the driving condition in which the exhaust gas pressure becomes the maximum, it is necessary to set, as the limit value, the operating amount which can generate the actuator driving force which can certainly presses the waste gate valve to the fully closed position and maintain the fully closed state.

As mentioned above, in JP 2015-166571 A, since learning of the fully closed position is performed in the state where the operating amount of the actuator stuck to the maximum value, after completing learning of the fully closed position, when the target opening degree is set to the fully closed position or slightly open side of the fully closed position, the actuator operating amount increases to the maximum or near the maximum, it causes deterioration of fuel efficiency by consuming large power wastefully, and it is worried that in the worst case, the motor built in the actuator overheats and breaks down by overheating by excessive energization. These are problems.

In JP 6038271 B, although the motor built in the actuator can be suppressed from overheating by excessive energization, even in the driving condition in which the exhaust gas pressure becomes the maximum, it is necessary to set, as the limit value, the operating amount which can generate the actuator driving force which can certainly presses the waste gate valve to the fully closed position and maintain the fully closed state. Therefore, even in the light load operation region in which pressure of the exhaust gas is low relatively, when near the fully closed position is set to the target opening degree, actuator operating amount becomes unnecessarily large compared with the opposing pressure of the exhaust gas, and it causes deterioration of fuel efficiency by consuming large power wastefully. These remain as problems.

The present invention has been implemented in order to solve the foregoing problem; the objective thereof is to provide a controller and control method for an internal combustion engine that can suppress the motor built in the actuator from overheating when the waste gate valve is controlled to near the fully closed position or the fully opened position, and can suppress from causing deterioration of fuel efficiency by consuming large power wastefully even in the light load operation region in which pressure of the exhaust gas is low relatively.

A controller for an internal combustion engine according to the present invention is a controller for an internal combustion engine that is provided with a turbocharger which has a turbine provided in an exhaust path, a compressor which is provided in an intake path and rotates integrally with the turbine, an exhaust gas bypass which communicates upstream side and downstream side of the turbine, a waste gate valve which adjusts flow rate of exhaust gas which flows through the exhaust gas bypass, and an electric valve actuator which changes an operating position of the waste gate valve, the controller for the internal combustion engine including:

a driving condition detector that detects the operating position of the waste gate valve, and a real supercharging pressure which is an actual value of a pressure of an intake air compressed by the compressor;

a supercharging state determination calculator that determines whether it is in a supercharging driving state where the real supercharging pressure is higher or expected to become higher than an atmospheric pressure, or it is in a non-supercharging driving state where the real supercharging pressure is less than or equal to, or expected to become less than or equal to the atmospheric pressure;

a target opening degree calculator that calculates a target opening degree of the waste gate valve;

a real opening degree calculator that calculates a real opening degree of the waste gate valve based on the operating position of the waste gate valve;

an operating amount calculator that calculates a basic operating amount for bringing the real opening degree close to the target opening degree; in the case of determining that it is in the supercharging driving state, calculates an operating amount obtained by performing upper limitation of a magnitude of the basic operating amount by a preliminarily set first limit value, as a final operating amount; and in the case of determining that it is in the non-supercharging driving state, calculates an operating amount obtained by performing upper limitation of the magnitude of the basic operating amount by a second limit value which is preliminarily set to a smaller value than the first limit value, as the final operating amount; and an actuator driver that performs driving control of the electric valve actuator based on the final operating amount.

A control method for an internal combustion engine according to the present invention is a control method for an internal combustion engine that is provided with a turbocharger which has a turbine provided in an exhaust path, a compressor which is provided in an intake path and rotates integrally with the turbine, an exhaust gas bypass which communicates upstream side and downstream side of the turbine, a waste gate valve which adjusts flow rate of exhaust gas which flows through the exhaust gas bypass, and an electric valve actuator which changes an operating position of the waste gate valve, the control method for the internal combustion engine including:

a driving condition detecting that detects the operating position of the waste gate valve, and a real supercharging pressure which is an actual value of a pressure of an intake air compressed by the compressor;

a supercharging state determining that determines whether it is in a supercharging driving state where the real supercharging pressure is higher or expected to become higher than an atmospheric pressure, or it is in a non-supercharging driving state where the real supercharging pressure is less than or equal to, or expected to become less than or equal to the atmospheric pressure;

a target opening degree calculating that calculates a target opening degree of the waste gate valve;

a real opening degree calculating that calculates a real opening degree of the waste gate valve based on the operating position of the waste gate valve;

an operating amount calculating that calculates a basic operating amount for bringing the real opening degree close to the target opening degree; in the case of determining that it is in the supercharging driving state, calculates an operating amount obtained by performing upper limitation of a magnitude of the basic operating amount by a preliminarily set first limit value, as a final operating amount; and in the case of determining that it is in the non-supercharging driving state, calculates an operating amount obtained by performing upper limitation of the magnitude of the basic operating amount by a second limit value which is preliminarily set to a smaller value than the first limit value, as the final operating amount; and an actuator driving that performs driving control of the electric valve actuator based on the final operating amount.

According to the controller and the control method for the internal combustion engine concerning the present invention, even in the case where the waste gate valve may butt against the fully closed position or the fully opened position and the magnitude of the basic operating amount of the electric valve actuator may become excessive by erroneous setting or erroneous learning of the fully closed position or the fully opened position of the waste gate valve, since the magnitude of the basic operating amount is upper-limited by the first limit value or the second limit value, the power consumption of the electric valve actuator is reduced, and deterioration of fuel efficiency can be suppressed, and overheat of the electric valve actuator can be suppressed.

Since in the supercharging driving state, the flow rate of the exhaust gas increases and the pressure of the exhaust gas becomes high compared with the non-supercharging driving state, the magnitude of the operating amount of the electric valve actuator for maintaining the waste gate valve to a certain opening degree against the pressure of the exhaust gas becomes large. On the other hand, since in the non-supercharging driving state, the pressure of the exhaust gas becomes low compared with the supercharging driving state, the magnitude of the operating amount of the electric valve actuator for maintaining the waste gate valve to a certain opening degree becomes small. Since the second limit value of the non-supercharging driving state is set to a value smaller than the first limit value of the supercharging driving state, the power consumption of the non-supercharging driving state in which the magnitude of the operating amount required becomes small is further reduced compared with the supercharging driving state. In normal operation, since frequency of the non-supercharging driving state becomes high, the reduction effect of power consumption becomes large.

BRIEF DESCRIPTION OF THE DRAWINGS

FIG. 8 is a time chart for explaining the behavior of the operating amount limitation processing according to Embodiment 1 of the present invention;

FIG. 11 is a flowchart for explaining the processing of the controller according to Embodiment 3 of the present invention.

DETAILED DESCRIPTION OF THE EMBODIMENTS

Embodiment 1

Figure 1:
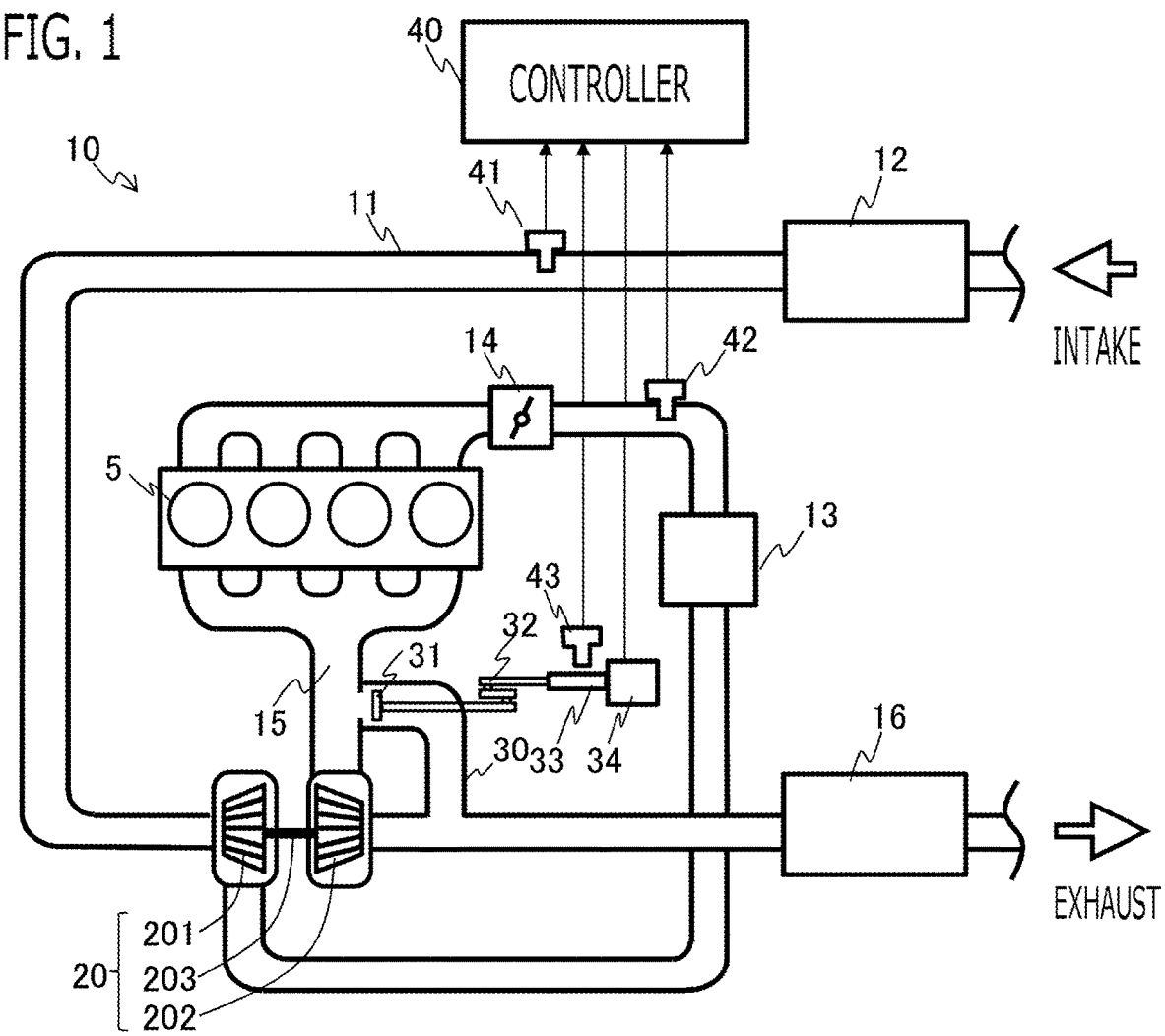
FIG. 1 is a schematic configuration diagram of the internal combustion engine and the controller according to Embodiment 1 of the present invention.

FIG. 1 is a configuration diagram showing a whole system to which a controller 40 of an internal combustion engine 10 (hereinafter, referred to simply as a controller 40) is applied according to Embodiment 1 of the present invention. The internal combustion engine 10 has a cylinder 5 in which a fuel-air mixture is combusted. The internal combustion engine 10 is provided with an intake path 11 which supplies air to the cylinder 5. An air cleaner 12 is mounted at an inlet of the intake path 11 of the internal combustion engine 10. An air flow sensor 41 for detecting an intake air amount is provided in the part of the intake path 11 at the downstream side of the air cleaner 12. A compressor 201 of a turbocharger 20 is provided in the part of the intake path 11 at the downstream side of the air flow sensor 41. The compressor 201 and a turbine 202 of the turbocharger 20 are connected by a connecting shaft 203; and the compressor 201 is rotated by energy of the exhaust gas inputted into the turbine 202. An intercooler 13 for cooling the compressed air is provided in the part of the intake path 11 at the further downstream side of the compressor 201. A throttle valve 14 is provided in the part of the intake path 11 at the further downstream side of the intercooler 13. A supercharging pressure sensor 42 which outputs an electric signal according to a supercharging pressure which is a pressure of the intake air compressed by the compressor 201 is provided between the intercooler 13 and the throttle valves 14. The part of the intake path 11 at the downstream side of the throttle valve 14 is an intake manifold which distributes the intake air to the cylinders 5.

The internal combustion engine 10 is provided with an exhaust path 15 which discharges the exhaust gas combusted in the cylinder 5. The turbine 202 of the turbocharger 20 mentioned above is provided in the middle of the exhaust path 15. The exhaust gas purification catalyst 16 for purifying the exhaust gas is provided in the part of the exhaust path 15 at the downstream side of the turbine 202. An exhaust gas bypass 30 which bypasses the turbine 202 and connects the inlet side and the outlet side of the turbine 202 is provided in the exhaust path 15. A waste gate valve 31 as an exhaust air bypass valve which adjusts a flow rate of the exhaust gas which flows through the exhaust gas bypass 30 is provided in the exhaust gas bypass 30. An electric valve actuator 34 which is an electric actuator which changes an operating position of the waste gate valve 31, and a valve position sensor 43 which outputs an electric signal according to the operating position of the waste gate valve 31 are provided.

Figure 4:
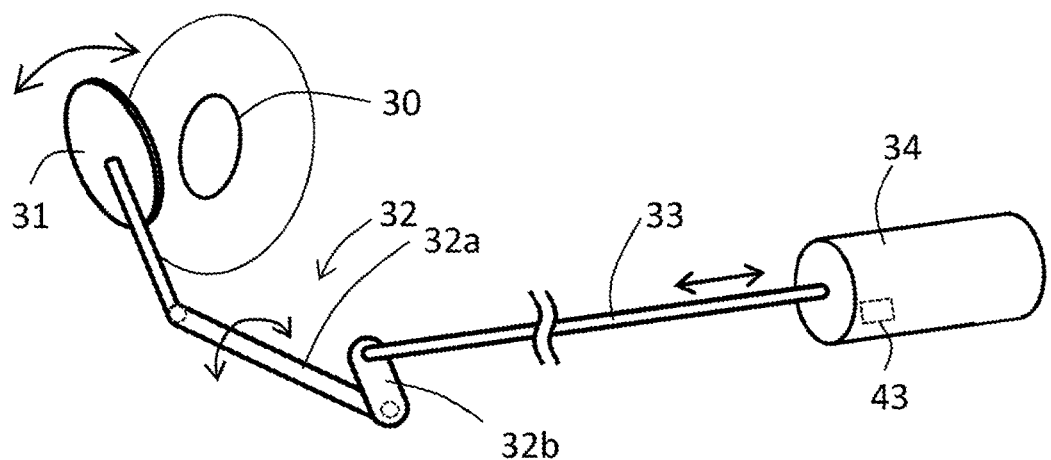
FIG. 4 is a schematic diagram of the drive mechanism of the waste gate valve according to Embodiment 1 of the present invention.

The waste gate valve 31 and the electric valve actuator 34 are mechanically connected by a connecting mechanism 32. In the present embodiment, as shown in FIG. 4, the connecting mechanism 32 is a linkage mechanism which converts linear motion of an output shaft 33 of the electric valve actuator 34 into rotary motion which opens and closes the waste gate valve 31. The connecting mechanism 32 is provided with a valve rotary shaft 32*a* which rotates the waste gate valve 31, and an arm 32b which extends in the radial-direction outside from the valve rotary shaft 32a, and rotates integrally with the valve rotary shaft 32a. The end of the arm 32b and the end of the output shaft 33 of the electric valve actuator 34 are pivotally connected with each other by a pin and the like. Accordingly, when the output shaft 33 of the electric valve actuator 34 moves to one side of the axial direction, the waste gate valve 31 closes; when the output shaft 33 of the electric valve actuator 34 moves to the other side of the axial direction, the waste gate valve 31 opens; and the opening degree of the waste gate valve 31 changes according to the moving position of the output shaft 33 of the electric valve actuator 34.

The electric valve actuator 34 is provided with an electric motor of which a generating direction of normal rotation or reverse rotation of rotation driving force and a magnitude of rotational driving force are controlled by the controller 40, a conversion mechanism which converts the rotary motion of the electric motor to the linear motion, and the output shaft 33 which moves linearly to one side or the other side of the axial direction by the conversion mechanism. A feed screw mechanism, a rack-and-pinion mechanism, or the like is used for the conversion mechanism. The output shaft 33 is a rod-shaped member which is longer than the arm 32b of the connecting mechanism 32 and the like, for reduction of the heat transmitted from the housing of the turbine 202 to the electric valve actuator 34, and restriction of arrangement space. The valve position sensor 43 detects the moving position, in the axial direction, of the output shaft 33 of the electric valve actuator 34. The valve position sensor 43 is built in the electric valve actuator 34, or is disposed near the electric valve actuator 34.

The electric motor of the electric valve actuator 34 is a DC motor. The magnitude of the rotational driving force generated by the electric motor, and the generating direction of normal rotation or reverse rotation of driving force change according to the magnitude of supply current supplied to the electric motor and the direction of supply current.

Figure 2:
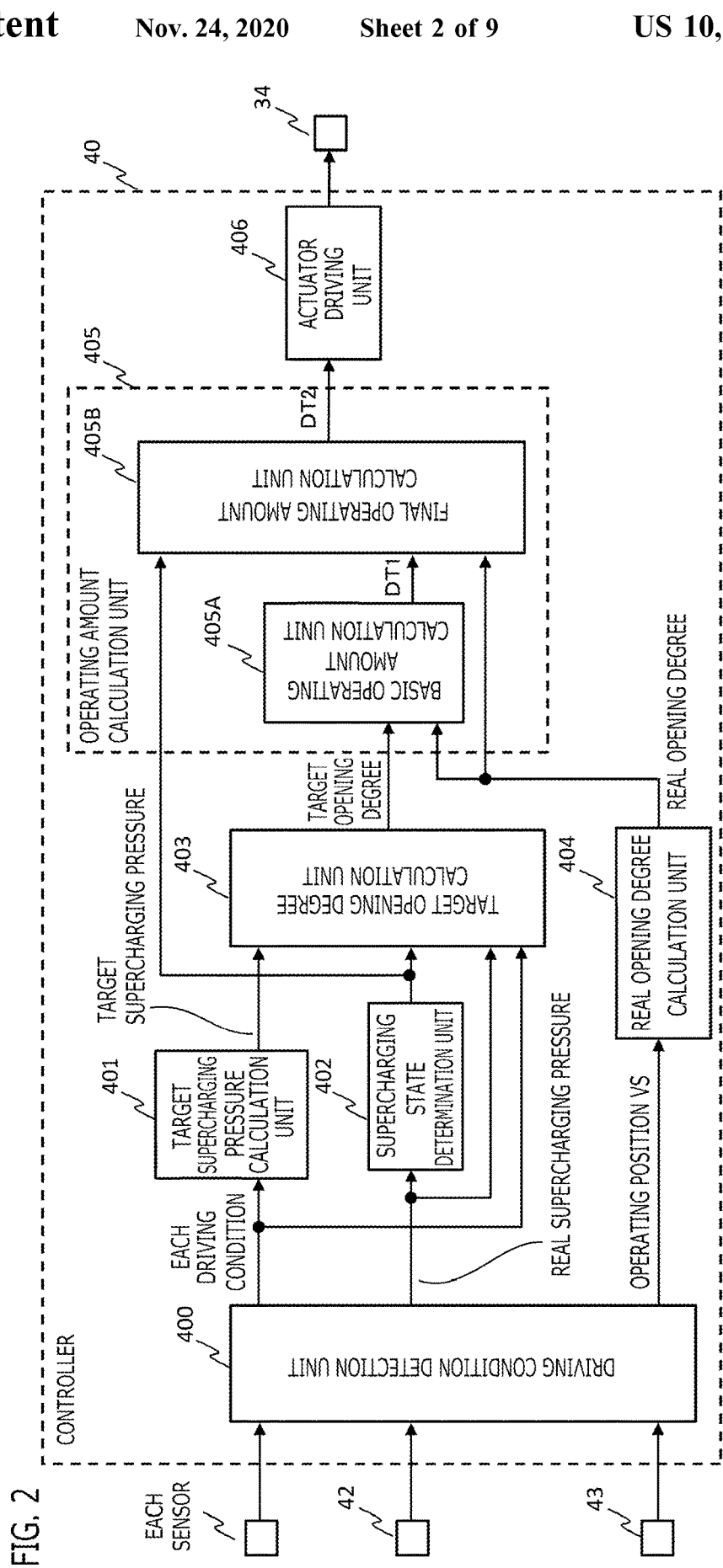
FIG. 2 is a block diagram of the controller according to Embodiment 1 of the present invention.
Figure 3:
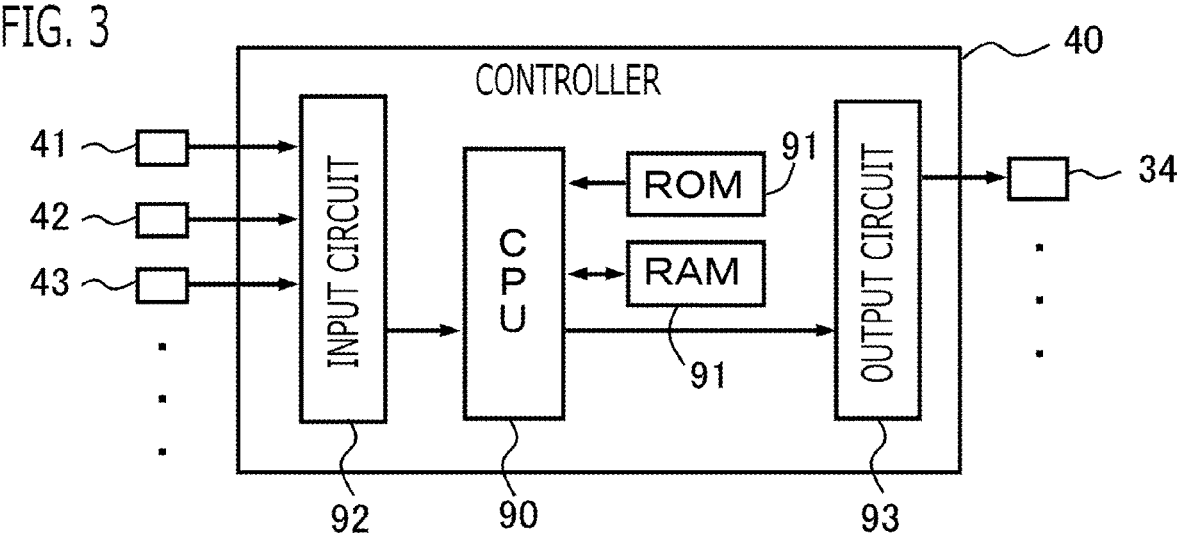
FIG. 3 is a hardware configuration diagram of the controller according to Embodiment 1 of the present invention.

The controller 40 is the one whose control subject is the internal combustion engine 10. As shown in FIG. 2, the controller 40 is provided with control units such as a driving condition detection unit 400, a target supercharging pressure calculation unit 401, a supercharging state determination unit 402, a target opening degree calculation unit 403, a real opening degree calculation unit 404, an operating amount calculation unit 405, and an actuator driving unit 406. The respective control units 400 through 406 and the like of the controller 40 are realized by processing circuits included in the controller 40. Specifically, as shown in FIG. 3, the controller 40 includes, as a processing circuit, a computing processing unit (computer) 90 such as a CPU (Central Processing Unit), storage apparatuses 91 that exchange data with the computing processing unit 90, an input circuit 92 that inputs external signals to the computing processing unit 90, an output circuit 93 that outputs signals from the computing processing unit 90 to the outside, and the like.

As the computing processing unit 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the computing processing unit 90, a plurality of the same type ones or the different type ones may be provided, and each processing may be shared and executed. As the storage apparatuses 91, there are provided a RAM (Random Access Memory) which can read data and write data from the computing processing unit 90, a ROM (Read Only Memory) which can read data from the computing processing unit 90, and the like. The input circuit 92 is connected with various kinds of sensors and switches and is provided with an A/D converter and the like for inputting output signals from the sensors and the switches to the computing processing unit 90. The output circuit 93 is connected with electric loads and is provided with a driving circuit and the like for outputting a control signal from the computing processing unit 90.

In addition, the computing processing unit 90 runs software items (programs) stored in the storage apparatus 91 such as a ROM and collaborates with other hardware devices in the controller 40, such as the storage apparatus 91, the input circuit 92, and the output circuit 93, so that the respective functions of the control units 400 through 406 included in the controller 40 are realized. Setting data items such as characteristic data and determination values to be utilized in the control units 400 through 406 are stored, as part of software items (programs), in the storage apparatus 91 such as a ROM.

In the present embodiment, the input circuit 92 is connected with various kinds of sensors such as the air flow sensor 41, the supercharging pressure sensor 42, the valve position sensor 43, a crank angle sensor which detects a rotational angle of a crankshaft of the internal combustion engine 10, a throttle position sensor which detects an opening degree of the throttle valve 14, and an atmospheric pressure sensor which detects an atmospheric pressure. The output circuit 93 is connected with various kinds of actuators such as the electric valve actuator 34, an injector, and an ignition coil. Then, the controller 40 controls the pressure of the intake air compressed by the compressor 201 to a desired supercharging pressure by driving various kinds of actuators mentioned above based on various kinds of input information mentioned above, and also controls combustion state and output torque of the internal combustion engine 10 appropriately.

<Driving Condition Detection Unit 400>

The driving condition detection unit 400 implements a driving condition detection processing that detects the driving condition of the internal combustion engine 10 and the vehicle. The driving condition detection unit 400 detects various kinds of driving condition, based on the output signals of various kinds of sensors and the like. In the present embodiment, the driving condition detection unit 400 detects an operating position of the waste gate valve 31, and a real supercharging pressure which is an actual value of the pressure of the intake air compressed by the compressor 201. The driving condition detection unit 400 detects the operating position of the waste gate valve 31 based on the output signal of the valve position sensor 43. The driving condition detection unit 400 detects the real supercharging pressure based on the output signal of the supercharging pressure sensor 42.

<Target Supercharging Pressure Calculation Unit 401>

The target supercharging pressure calculation unit 401 implements a target supercharging pressure calculation processing that calculates a target supercharging pressure which is a target value of the supercharging pressure. In the present embodiment, the target supercharging pressure calculation unit 401 calculates the target supercharging pressure based on the driving condition of the internal combustion engine 10, such as the rotational speed of the internal combustion engine 10, and the cylinder intake air amount.

<Supercharging State Determination Unit 402>

The supercharging state determination unit 402 implements a supercharging state determination processing that determines whether it is in a supercharging driving state where the real supercharging pressure is higher or expected to become higher than the atmospheric pressure, or it is in a non-supercharging driving state where the real supercharging pressure is less than or equal to, or expected to become less than or equal to the atmospheric pressure. In the present embodiment, in the case where the real supercharging pressure detected by the supercharging pressure sensor 42 is higher than the atmospheric pressure, the supercharging state determination unit 402 determines that it is in the supercharging driving state; and in the case where the real supercharging pressure detected by the supercharging pressure sensor 42 is less than or equal to the atmospheric pressure, the supercharging state determination unit 402 determines that it is in the non-supercharging driving state. Alternatively, in the case where the target supercharging pressure is higher than the atmospheric pressure, the supercharging state determination unit 402 may determine that it is in the supercharging driving state; and in the case where the target supercharging pressure is less than or equal to the atmospheric pressure, the supercharging state determination unit 402 may determine that it is in the non-supercharging driving state. In the present embodiment, since the supercharging pressure is the pressure at the upstream side of the throttle valve 14, in the non-supercharging driving state, the supercharging pressure becomes equal to the atmospheric pressure, or becomes slightly lower than the atmospheric pressure by pressure loss of the intake path 11, the air cleaner 12, the compressor 201, and the like.

Figure 5:
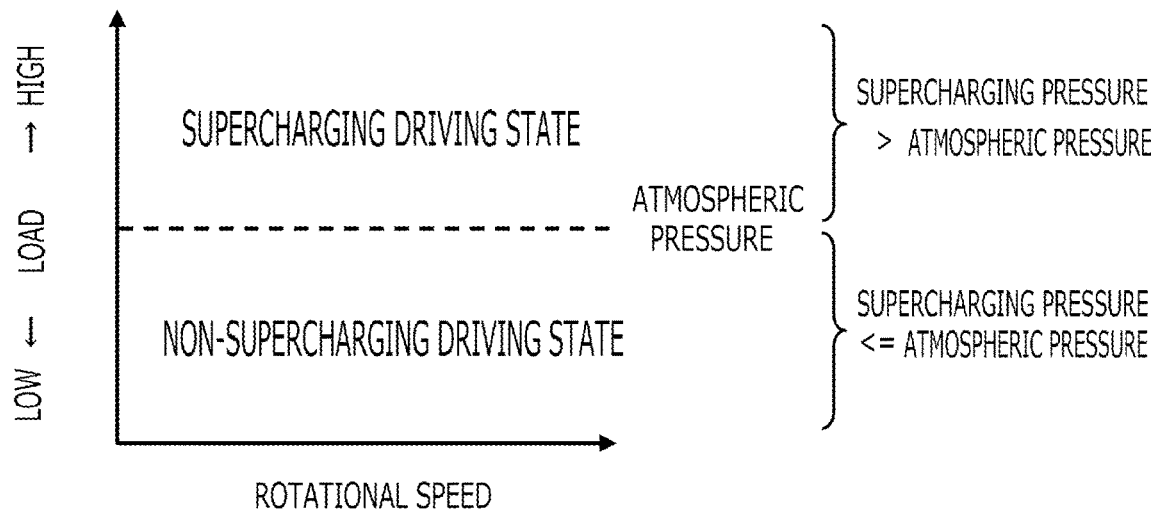
FIG. 5 is a characteristic figure for explaining the supercharging driving state and the non-supercharging driving state according to Embodiment 1 of the present invention.

FIG. 5 shows the relationship of the rotational speed and the load of the internal combustion engine 10, and the supercharging driving state and the non-supercharging driving state. When the pressure in the intake manifold rises by opening the throttle valve 14, as a result, the cylinder intake air amount increases, the fuel quantity corresponding to the cylinder intake air amount is injected and supplied, and the load increases by compressing, igniting and burning. For example, when the throttle valve 14 is gradually opened from full close to full open, the pressure in the intake manifold rises and the load also becomes high. Then, the pressure in the intake manifold reaches the atmospheric pressure after a while. In this way, when the pressure in the intake manifold is less than or equal to the atmospheric pressure, it is in the non-supercharging driving state. In the internal combustion engine 10 equipped with the turbocharger 20, when the compressor 201 is driven, the intake air is compressed, and the pressure in the intake manifold rises rather than the atmospheric pressure, then it is in the supercharging driving state. Since the cylinder intake air amount of the supercharging driving state becomes larger than that of the non-supercharging driving state relatively, and also the pressure of the exhaust gas discharged from the internal combustion engine 10 of the supercharging driving state becomes higher than that of the non-supercharging driving state relatively.

<Target Opening Degree Calculation Unit 403>

The target opening degree calculation unit 403 implements a target opening degree calculation processing that calculates a target opening degree of the waste gate valve 31. In the present embodiment, the target opening degree calculation unit 403 calculates the target opening degree based on the driving condition of the internal combustion engine 10, such as the target supercharging pressure, the real supercharging pressure, and the supercharging state determination result of the supercharging driving state or the non-supercharging driving state. In the case of determining that it is in the supercharging driving state, the target opening degree calculation unit 403 calculates the opening degree of the waste gate valve 31 for bringing the real supercharging pressure close to the target supercharging pressure, as the target opening degree. For example, the target opening degree calculation unit 403 calculates the target opening degree by a feedback control based on the difference between the target supercharging pressure and the real supercharging pressure. In the case of raising the real supercharging pressure, the target opening degree is decreased, and in the case of lowering the real supercharging pressure, the target opening degree is increased. In the supercharging driving state, the target opening degree is set to the fully closed opening degree or the larger opening degree than the fully closed opening degree.

In the case of determining that it is in the non-supercharging driving state, the target opening degree calculation unit 403 calculates the opening degree of the waste gate valve 31 which is preliminarily set for every driving condition of the internal combustion engine 10, such as the rotational speed and the load of the internal combustion engine 10, as the target opening degree. In the non-supercharging driving state, basically, in order to reduce the pressure of the exhaust gas at the upstream side of the turbine 202 and improve fuel efficiency by reduction of pumping loss, the target opening degree is set to a larger opening degree than the fully closed opening degree, and the waste gate valve 31 is opened.

However, even in the non-supercharging driving state, depending on the driving condition of the internal combustion engine 10, the target opening degree is set to the fully closed opening degree. For example, in order to reduce vibration of the exhaust path 15 by resonance between exhaust pulsation and the exhaust path 15, the target opening degree is set to the fully closed opening degree in a predetermined driving condition, such as a low rotation speed region. By fully closing the waste gate valve 31, the exhaust pulsation of the cylinder 5 which becomes a frequency according to the rotational speed is no longer transmitted to the exhaust path 15 at the downstream side of the turbine 202 via the exhaust gas bypass 30, the resonance frequency rises, and occurrence of resonance can be suppressed. In the driving condition which is expected to transit to the supercharging driving state, the target opening degree is previously set to the full close state, so that at the time of transition to the supercharging driving state, a time lag until the waste gate valve 31 is fully closed does not occur. For example, when the accelerator opening degree increases, even though it is in the non-supercharging driving state, the target opening degree is set to the fully closed opening degree.

<Real Opening Degree Calculation Unit 404>

The real opening degree calculation unit 404 implements a real opening degree calculation processing that calculates a real opening degree of the waste gate valve 31 based on the operating position of the waste gate valve 31 detected by the driving condition detection unit 400.

Figure 6:
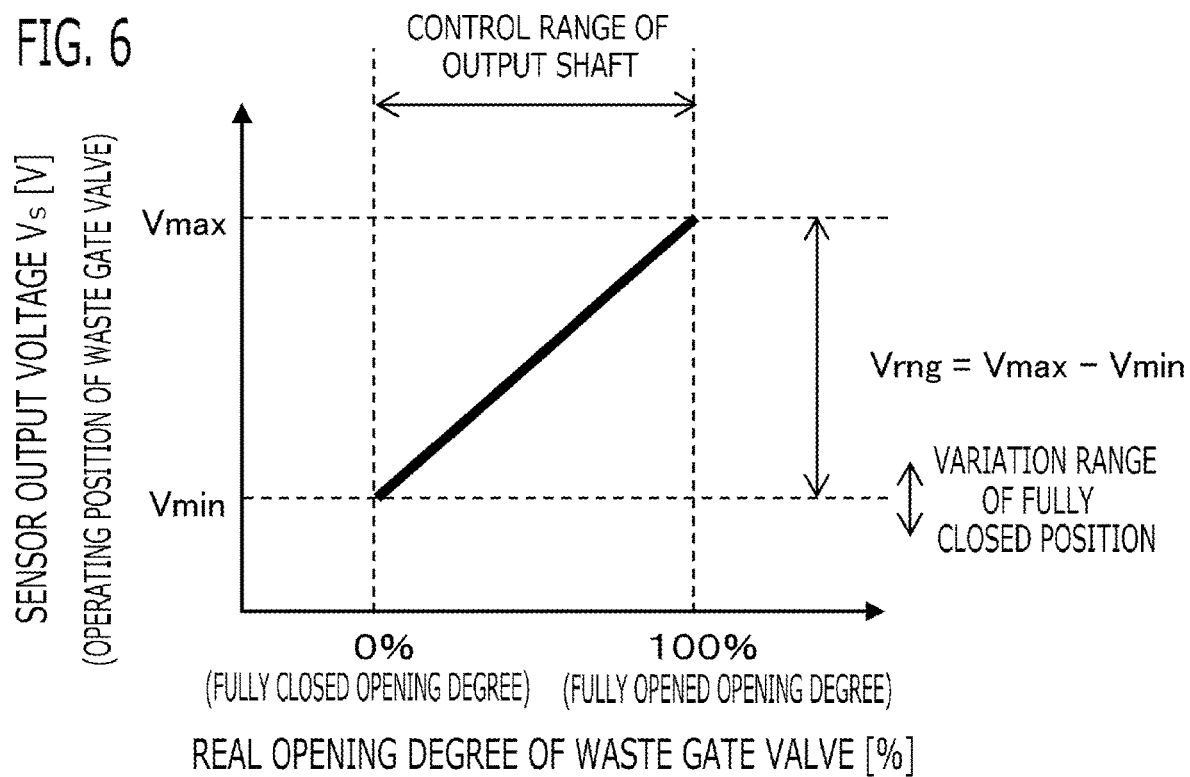
FIG. 6 is a characteristic figure of the opening degree of the waste gate valve according to Embodiment 1 of the present invention.

FIG. 6 is a characteristic figure in which a vertical axis shows the output voltage Vs of the valve position sensor 43 which is detected as the operating position of the waste gate valve 31, and a horizontal axis shows the real opening degree of the waste gate valve 31. By use of the equation (1), the real opening degree calculation unit 404 calculates the real opening degree of the waste gate valve 31 based on the output voltage Vs (hereinafter, referred to also as the operating position Vs) of the valve position sensor 43, and the output voltage Vmin of the fully closed position (hereinafter, referred to also as the fully closed position Vmin). Here, Vrng is a variation width of the output voltage Vs at the time of changing from the fully closed position to the fully opened position.

$$\text{Real opening degree [\%]} = (Vs - V\text{min}) / V\text{rng} \times 100 \quad (1)$$

Although the output voltage Vmin of the fully closed position may be a preliminarily set value, the output voltage Vmin is a learning value in the present embodiment. A fully closed position deviates from a design value by various factors, such as a deviation of the attachment position at the time of attaching the waste gate valve 31 to the exhaust gas bypass 30, a drift of the output voltage by a temperature characteristic of the valve position sensor 43, and a thermal expansion of turbocharger member.

Accordingly, the real opening degree calculation unit 404 learns the operating position Vs of the waste gate valve 31 at the time of determining that the waste gate valve 31 is in the fully closed state, as the fully closed position Vmin; and calculates the real opening degree based on the operating position of the waste gate valve 31 on the basis of the learned fully closed position Vmin. According to this configuration, the operating position Vs of the waste gate valve 31 at the time of pressing the waste gate valve 31 to the fully closed position and controlling to the fully closed state is learned as the true fully closed position Vmin; and by calculating the real opening degree on the basis of the learned fully closed position Vmin, the calculation accuracy of the real opening degree can be improved.

<Actuator Driving Unit 406>

The actuator driving unit 406 implements a valve driving processing that performs driving control of the electric valve actuator 34 based on the final operating amount DT2 calculated by the operating amount calculation unit 405 described below.

In the present embodiment, as mentioned above, the electric valve actuator 34 is provided with the electric motor (in this example, DC motor), and the actuator driving unit 406 supplies a driving current corresponding to the final operating amount DT2, to the electric valve actuator 34. Accordingly, the electric valve actuator 34 is driven, the operating position of the waste gate valve 31 changes, and the real opening degree of the waste gate valve 31 changes.

Figure 7:
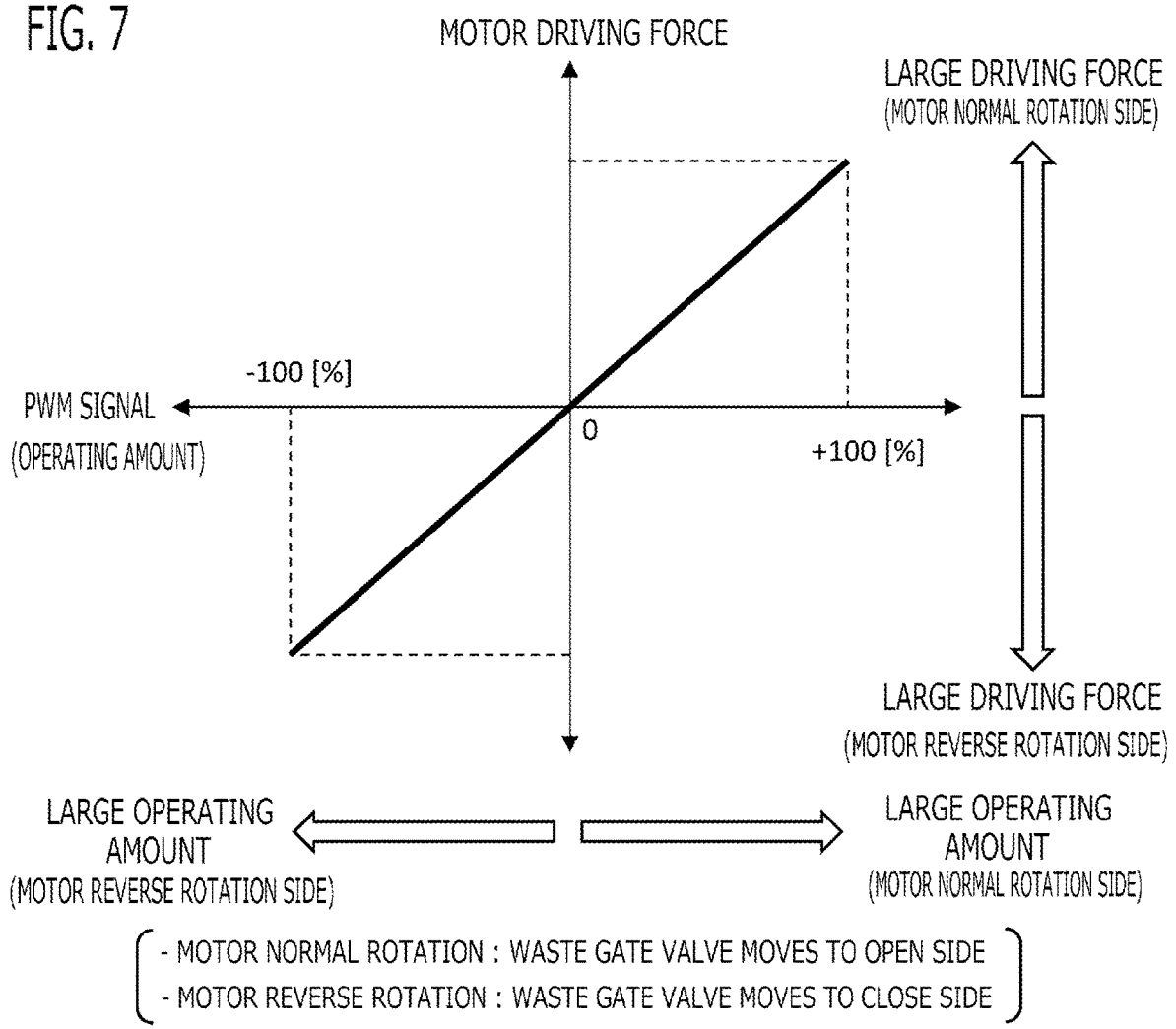
FIG. 7 is a characteristic figure of the driving force of the electric motor according to Embodiment 1 of the present invention.

The operating amount of the electric valve actuator 34 is a parameter which determines the energizing direction and the magnitude of energizing current of the DC motor, for example, a PWM signal (ON duty signal from −100 [%] to +100 [%]). FIG. 7 is a characteristic figure showing the relationship between the operating amount of the electric valve actuator 34, and the driving force generated by the DC motor. When the PWM signal which is the operating amount is 0 [%], the motor current becomes 0 and the driving force generated by the DC motor also becomes 0. Then, at the time of 0[%]<PWM signal<=100 [%], the current for normal rotation according to the magnitude (absolute value) of the PWM signal flows to the DC motor, and the output shaft 33 is pushed out to the outside of the electric valve actuator 34. Accordingly, the waste gate valve 31 moves to the open side. At the time of −100[%]<=PWM signal<0 [%], the current for reverse rotation according to the magnitude (absolute value) of the PWM signal flows to the DC motor, and the output shaft 33 is drawn into the inside of the electric valve actuator 34. Accordingly, the waste gate valve 31 moves to the close side. In this way, according to the operating amount of the electric valve actuator 34, the driving force of the electric valve actuator 34 changes.

<Operating Amount Calculation Unit 405>

The operating amount calculation unit 405 is provided with a basic operating amount calculation unit 405A and a final operating amount calculation unit 405B that implement an operating amount calculation processing that calculates the operating amount of the electric valve actuator 34. The basic operating amount calculation unit 405A implements a basic operating amount calculation processing that calculates a basic operating amount DT1 for bringing the real opening degree close to the target opening degree. In the present embodiment, the basic operating amount calculation unit 405A calculates the basic operating amount DT1 by feedback control, such as PID control, based on the difference between the target opening degree and the real opening degree. The basic operating amount calculation unit 405A changes the basic operating amount DT1 within a settable range of the operating amount (in this example, within a range of −100 [%] to +100 [%]).

The final operating amount calculation unit 405B implements an operating amount 1 imitation processing that in the case of determining that it is in the supercharging driving state, calculates an operating amount obtained by performing upper limitation of the magnitude (absolute value) of the basic operating amount DT1 by a preliminarily set first limit value L1, as the final operating amount DT2; and in the case of determining that it is in the non-supercharging driving state, calculates an operating amount obtained by performing upper limitation of the magnitude (absolute value) of the basic operating amount DT1 by a second limit value L2 which is preliminarily set to a value smaller than the first limit value L1, as the final operating amount DT2.

At the time of controlling the waste gate valve 31 to the fully closed opening degree or the fully opened opening degree, by erroneous setting or erroneous learning of the fully closed position or the fully opened position, the waste gate valve 31 may butt against the fully closed position or the fully opened position, and the magnitude of the basic operating amount DT1 of the electric valve actuator 34 may become excessive. Even in this case, since the magnitude of basic operating amount DT1 is upper-limited by the first limit value L1 or the second limit value L2, the power consumption of the electric valve actuator 34 is reduced, and deterioration of fuel efficiency can be suppressed, and overheat of the electric valve actuator 34 can be suppressed.

Since in the supercharging driving state, the flow rate of the exhaust gas increases and the pressure of the exhaust gas becomes high compared with the non-supercharging driving state, the magnitude of the operating amount of the electric valve actuator 34 for maintaining the waste gate valve 31 to a certain opening degree against the pressure of the exhaust gas becomes large. On the other hand, since in the non-supercharging driving state, the pressure of the exhaust gas becomes low compared with the supercharging driving state, the magnitude of the operating amount of the electric valve actuator 34 for maintaining the waste gate valve 31 to a certain opening degree becomes small. Since the second limit value L2 of the non-supercharging driving state is set to a value smaller than the first limit value L1 of the supercharging driving state, the power consumption of the non-supercharging driving state in which the magnitude of the operating amount required becomes small is further reduced compared with the supercharging driving state. Therefore, even in the cases where the magnitude of the basic operating amount DT1 becomes excessive, according to the supercharging driving state or the non-supercharging driving state, power consumption can be reduced appropriately.

Specifically, as shown in the equation (2), in the case of determining that it is in the supercharging driving state, when the basic operating amount DT1 is smaller than the negative first limit value (−L1), the final operating amount calculation unit 405B sets the negative first limit value (−L1) to the final operating amount DT2; when the basic operating amount DT1 is larger than the positive first limit value (+L1), the final operating amount calculation unit 405B sets the positive first limit value (+L1) to the final operating amount DT2; and when the basic operating amount DT1 is within a range from the negative first limit value (−L1) to the positive first limit value (+L1), the final operating amount calculation unit 405B sets the basic operating amount DT1 to the final operating amount DT2. The first limit value L1 itself is a positive value (L1>0).

A) In the case of the supercharging driving state

1) At the time of DT1<−L1

$$DT2 = -L1$$

2) At the time of DT1>+L1

$$DT2 = +L1 \quad (2)$$

3) At the time of −L1<=DT1<=+L1

$$DT2 = DT1$$

As shown in the equation (3), in the case of determining that it is in the non-supercharging driving state, when the basic operating amount DT1 is smaller than the negative second limit value (−L2), the final operating amount calculation unit 405B sets the negative second limit value (−L2) to the final operating amount DT2; when the basic operating amount DT1 is larger than the positive second limit value (+L2), the final operating amount calculation unit 405B sets the positive second limit value (+L2) to the final operating amount DT2; and when the basic operating amount DT1 is within the range from the negative second limit value (−L2) to the positive second limit value (+L2), the final operating amount calculation unit 405B sets the basic operating amount DT1 to the final operating amount DT2. The second limit value L2 itself is a positive value (L2>0).

B) In the case of the non-supercharging driving state

1) At the time of DT1<−L2

$$DT2 = -L2$$

2) At the time of DT1>+L2

$$DT2 = +L2 \quad (3)$$

3) At the time of −L2<=DT1<=+L2

$$DT2 = DT1$$

In the present embodiment, the pressure of the exhaust gas at the upstream side of the turbine 202 acts as an opening side power of the waste gate valve 31. The first limit value L1 is preliminarily set to a value corresponding to a minimum operating amount which can maintain a state where the waste gate valve 31 was pressed to the fully closed position against the pressure of the exhaust gas which acts on the waste gate valve 31, in a driving condition where the pressure of the exhaust gas at the upstream side of the turbine 202 becomes maximum in the supercharging driving state. For example, the first limit value L1 is set to an operating amount increased by a safety factor of dozens % (for example, 20%) from an operating amount which balances with the maximum pressure power of the exhaust gas in the fully closed state and the supercharging driving state. According to this configuration, in the whole region of the supercharging driving state, the waste gate valve 31 can be certainly maintained to the fully closed state, and the power consumption of the electric valve actuator 34 can be reduced.

The second limit value L2 is preliminarily set to a value corresponding to a minimum operating amount which can maintain a state where the waste gate valve 31 was pressed to the fully closed position against the pressure of the exhaust gas which acts on the waste gate valve 31, in a driving condition where the pressure of the exhaust gas at the upstream side of the turbine 202 becomes maximum in the non-supercharging driving state. For example, the second limit value L2 is set to an operating amount increased by a safety factor of dozens % (for example, 20%) from an operating amount which balances with the maximum pressure power of the exhaust gas in the fully closed state and the non-supercharging driving state. According to this configuration, in the whole region of the non-supercharging driving state, while the waste gate valve 31 can be certainly controlled to the fully closed state, the power consumption of the electric valve actuator 34 can be reduced.

The difference between the first limit value L1 and the second limit value L2 becomes a value according to the difference between the maximum pressure of the exhaust gas in the supercharging driving state, and the maximum pressure of the exhaust gas in the non-supercharging driving state; according to the supercharging state, the limit value can be changed to an appropriate value.

<Behavior of Operating Amount Limitation Processing>

Next, behavior of the operating amount limitation processing will be explained with reference to the time chart of FIG. 8. The horizontal axis of FIG. 8 is elapsed time; the vertical axis of the upper chart is the opening degree of the waste gate valve 31, and the upper chart shows behaviors of the real opening degree, the target opening degree, the true fully closed position, and the learning fully closed position. The vertical axis of the lower chart is the operating amount of the electric valve actuator 34, and the lower chart shows behaviors of the basic operating amount DT1 and the final operating amount DT2.

Although the learning fully closed position corresponds to the opening degree 0 [%] as a matter of course, the true fully closed position is varied by thermal expansion of the turbocharger member and the like, from the state where the fully closed position was learned last time, and the opening degree corresponding to the true fully closed position becomes 2 [%]. That is to say, it becomes in the state where the erroneous learning of the fully closed position occurs. Before the time T1, the target opening degree is set to 6 [%]. Since the target opening degree 6 [%] is larger than the opening degree 2 [%] corresponding to the true fully closed position, the real opening degree calculated based on the equation (1) follows the target opening degree 6 [%] by feedback control. In this state, since the real opening degree follows the target opening degree, the basic operating amount DT1 and the final operating amount DT2 becomes a small value of less than or equal to ±20%.

At the time T1, by change of driving condition and the like, the target opening degree falls to 1 [%] from 6 [%]. The target opening degree 1 [%] is smaller than the opening degree 2 [%] corresponding to the true fully closed position. After reducing of the target opening degree, by feedback control, the basic operating amount DT1 and the final operating amount DT2 increase in the negative direction which is the close side, and the real opening degree approaches the target opening degree. At the time T2, the real opening degree reaches the opening degree 2 [%] corresponding to the true fully closed position, the waste gate valve 31 butts against the fully closed position, and the real opening degree does not fall below 2 [%].

After the time T2, since the difference between the real opening degree and the target opening degree does not disappear, by integral calculation of feedback control and the like, the basic operating amount DT1 increases in the negative direction continuously, and reaches −100 [%] which is the maximum operating amount of the close side at the time T5. Unlike the present embodiment, if the operating amount limitation processing is not performed but excessive energization is performed, fuel efficiency is deteriorated by an increase in power consumption of the electric valve actuator 34, and it is worried that the electric motor may overheat and break down.

In the present embodiment, in the case of determining that it is in the supercharging driving state, when the magnitude of the basic operating amount DT1 reaches the first limit value L1 which is set to 60 [%] at the time T4, the magnitude of the basic operating amount DT1 is upper-limited by the first limit value L1 after the time T4. That is to say, after the time T4, since the basic operating amount DT1 becomes smaller than the negative first limit value (−60 [%]), the final operating amount DT2 is set to the negative first limit value (−60 [%]). In the supercharging driving state, while pressing the waste gate valve 31 to the fully closed position, the power consumption of the electric valve actuator 34 can be reduced, and the possibility of overheat of the electric motor can be reduced.

In the case of determining that it is in the non-supercharging driving state, when the magnitude of the basic operating amount DT1 reaches the second limit value L2 which is set to 40 [%] smaller than the first limit value L1 at the time T3, the magnitude of the basic operating amount DT1 is upper-limited by the second limit value L2 which is preliminarily set to a value smaller than the first limit value L1 after the time T3. That is to say, after the time T3, since the basic operating amount DT1 becomes smaller than the negative second limit value (−40 [%]), the final operating amount DT2 is set to the negative second limit value (−40 [%]). In the non-supercharging driving state in which the pressure of the exhaust gas is lower than the supercharging driving state, while pressing the waste gate valve 31 to the fully closed position by the second limit value L2 which is set to a value smaller than the first limit value L1, the power consumption of the electric valve actuator 34 can be further reduced rather than the supercharging driving state, and the possibility of overheat of the electric motor can be further reduced.

<Flowchart>

Figure 9:
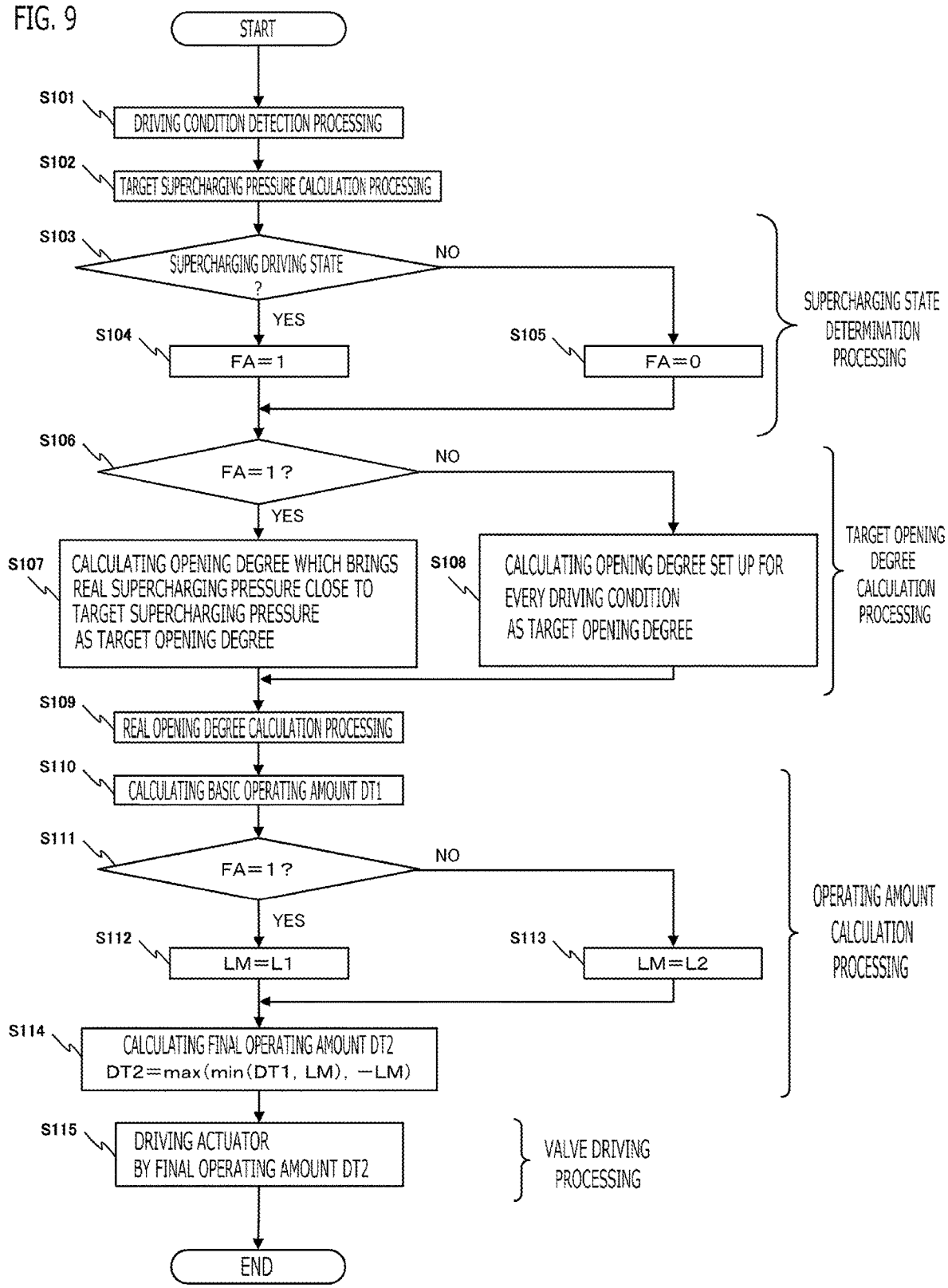
FIG. 9 is a flowchart for explaining the processing of the controller according to Embodiment 1 of the present invention.

The foregoing processing of each control units 400 through 406 and the like of the controller 40 can be configured such as the flowchart shown in FIG. 9. The processing of the flowchart in FIG. 9 is recurrently implemented, for example, every constant operation cycle while the computing processing unit 90 implements software (a program) stored in the storage apparatus 91.

In the step S101, as mentioned above, the driving condition detection unit 400 implements the driving condition detection processing (a driving condition detection step) that detects the driving condition of the internal combustion engine 10 and the vehicle based on the output signals of various kinds of sensors and the like. In the present embodiment, the driving condition detection unit 400 detects the operating position of the waste gate valve 31 and the real supercharging pressure. In the step S102, as mentioned above, the target supercharging pressure calculation unit 401 implements the target supercharging pressure calculation processing (a target supercharging pressure calculation step) that calculates the target supercharging pressure which is the target value of the supercharging pressure.

In the step S103 to the step S105, as mentioned above, the supercharging state determination unit 402 implements the supercharging state determination processing (a supercharging state determination step) that determines whether it is in the supercharging driving state or the non-supercharging driving state. In the present embodiment, in the step S103, the supercharging state determination unit 402 determines whether or not it is in the supercharging driving state; in the case of determining that it is in the supercharging driving state, the supercharging state determination unit 402 advances to the step S104 and sets a supercharging state determining flag FA to 1 representing the supercharging driving state (FA=1); and in the case of determining that it is not in the supercharging driving state, the supercharging state determination unit 402 advances to the step S105 and sets the supercharging state determining flag FA to 0 representing the non-supercharging driving state (FA=0).

In the step S106 to the step S108, as mentioned above, the target opening degree calculation unit 403 implements the target opening degree calculation processing (a target opening degree calculation step) that calculates the target opening degree of the waste gate valve 31. In the present embodiment, in step S106, the target opening degree calculation unit 403 determines whether or not the supercharging state determining flag FA is set to 1 representing the supercharging driving state. Then, in the case where the supercharging state determining flag FA is set to one, and it is determined that it is in the supercharging driving state, the target opening degree calculation unit 403 advances to the step S107, and calculates the opening degree of the waste gate valve 31 for bringing the real supercharging pressure close to the target supercharging pressure, as the target opening degree. On the other hand, in the case where the supercharging state determining flag FA is set to 0, and it is determined that it is in the non-supercharging driving state, the target opening degree calculation unit 403 advances to the step S108, and calculates the opening degree of the waste gate valve 31 which is preliminarily set for every driving condition of the internal combustion engine 10, as the target opening degree.

In the step S109, as mentioned above, the real opening degree calculation unit 404 implements the real opening degree calculation processing (a real opening degree calculation step) that calculates the real opening degree of the waste gate valve 31 based on the operating position of the waste gate valve 31 detected by the driving condition detection unit 400. In the present embodiment, the real opening degree calculation unit 404 learns the operating position of the waste gate valve 31 at the time of determining that the waste gate valve 31 is in the fully closed state, as the fully closed position; and calculates the real opening degree based on the operating position of the waste gate valve 31 on the basis of the learned fully closed position.

In the step S110 to the step S114, as mentioned above, the operating amount calculation unit 405 implements the operating amount calculation processing (an operating amount calculation step) that calculates the operating amount of the electric valve actuator 34. In the step S110, the basic operating amount calculation unit 405A implements the basic operating amount calculation processing that calculates the basic operating amount DT1 for bringing the real opening degree close to the target opening degree. In the present embodiment, the basic operating amount calculation unit 405A calculates the basic operating amount DT1 by feedback control based on the difference between the target opening degree and the real opening degree.

In the step S111 to the step S114, the final operating amount calculation unit 405B implements the operating amount limitation processing that in the case of determining that it is in the supercharging driving state, calculates an operating amount obtained by performing upper limitation of the magnitude of the basic operating amount DT1 by the preliminarily set first limit value L1, as the final operating amount DT2; and in the case of determining that it is in the non-supercharging driving state, calculates an operating amount obtained by performing upper limitation of the magnitude of the basic operating amount DT1 by the second limit value L2 which is preliminarily set to a value smaller than the first limit value L1, as the final operating amount DT2.

In the present embodiment, in the step S111, the final operating amount calculation unit 405B determines whether or not the supercharging state determining flag FA is set to 1 representing the supercharging driving state. In the case where the supercharging state determining flag FA is set to 1 representing the supercharging driving state, the final operating amount calculation unit 405B advances to the step S112 and sets a limit value LM to the first limit value L1; and in the case where the supercharging state determining flag FA is set to 0 representing the non-supercharging driving state, the final operating amount calculation unit 405B advances to the step S113 and sets the limit value LM to the second limit value L2. Then, in the step S114, the final operating amount calculation unit 405B performs a minimum value picking (min) that picks out a smaller value between the basic operating amount DT1 and the positive limit value (+LM), performs a maximum value picking (max) that picks out a larger value between the picked minimum value and the negative limit value (−LM); and calculates the picked maximum value as the final operating amount DT2.

In the last step S115, as mentioned above, the actuator driving unit 406 implements the valve driving processing (a valve driving step) that performs driving control of the electric valve actuator 34 based on the final operating amount DT2 calculated in the step S114.

Embodiment 2

Next, the controller 40 according to Embodiment 2 will be explained. The explanation for constituent parts the same as those in Embodiment 1 will be omitted. Although the basic configuration and processing of the internal combustion engine 10 and the controller 40 according to the present embodiment are the same as those of Embodiment 1, the operating amount limitation processing of the operating amount calculation unit 405 differs partially.

As is the case with Embodiment 1, the basic operating amount calculation unit 405A implements the basic operating amount calculation processing that calculates the basic operating amount DT1 for bringing the real opening degree close to the target opening degree. As is the case with Embodiment 1, the final operating amount calculation unit 405B implements the operating amount limitation processing that in the case of determining that it is in the supercharging driving state, calculates an operating amount obtained by performing upper limitation of the magnitude of the basic operating amount DT1 by the preliminarily set first limit value L1, as the final operating amount DT2; and in the case of determining that it is in the non-supercharging driving state, calculates an operating amount obtained by performing upper limitation of the magnitude of the basic operating amount DT1 by the second limit value L2 which is preliminarily set to a value smaller than the first limit value L1, as the final operating amount DT2.

Unlike Embodiment 1, in the case of determining that it is in the supercharging driving state, when a state where the magnitude of the basic operating amount DT1 is upper-limited by the first limit value L1 continues more than a preliminarily set switching determination time, the final operating amount calculation unit 405B switches the limit value, which is used for performing upper limitation of the magnitude of the basic operating amount DT1, from the first limit value L1 to the second limit value L2, and calculates an operating amount obtained by performing upper limitation of the magnitude of the basic operating amount DT1 by the second limit value L2, as the final operating amount DT2.

Depending on specifications, such as heat transfer from the exhaust pipe to the electric valve actuator 34, and cooling performance of the electric valve actuator 34, even if the magnitude of operating amount is lowered to the first limit value L1, the electric motor may overheat by driving with the first limit value L1 for a long time. According to the above-mentioned configuration, when the state of being upper-limited by the first limit value L1 continues more than the switching determination time, since the limit value is switched to the second limit value L2 from the first limit value L1 and operating amount is lowered to the second limit value L2, overheat of the electric motor can be suppressed more certainly. When the magnitude of operating amount is lowered to the second limit value L2 from the first limit value L1 in the supercharging driving state, although the waste gate valve 31 may open some under the condition that the pressure of the exhaust gas is large, overheat of an electric motor is suppressed preferentially.

In the case of determining that it is in the supercharging driving state, when the magnitude of the basic operating amount DT1 is no longer upper-limited by the second limit value L2 after switching the limit value, which is used for performing upper limitation of the magnitude of the basic operating amount DT1, from the first limit value L1 to the second limit value L2, the final operating amount calculation unit 405B switches again the limit value, which is used for performing upper limitation of the magnitude of the basic operating amount DT1, from the second limit value L2 to the first limit value L1, and ends a limit value forced switching processing.

According to this configuration, when no longer being upper-limited by the second limit value L2 after switching the limit value to the second limit value L2, since it can be determined that the state where operating amount became excessive stopped continuing, the limit value can be returned to the first limit value L1 which is a larger value, and control performance of opening degree control can be improved.

<Flowchart>

Figure 10:
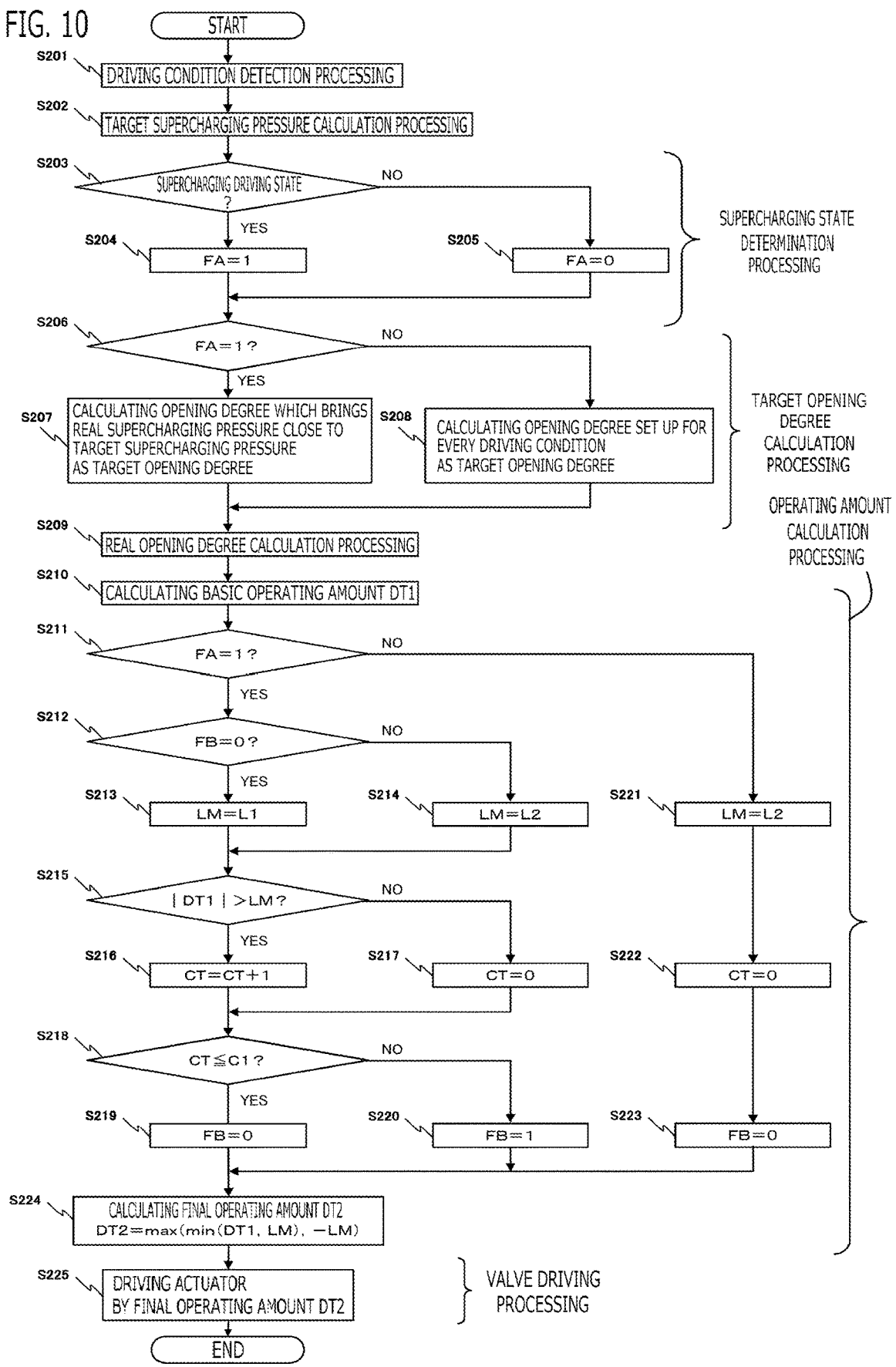
FIG. 10 is a flowchart for explaining the processing of the controller according to Embodiment 2 of the present invention.

The processing of each control units 400 through 406 and the like of the controller 40 according to Embodiment 2 can be configured such as the flowchart shown in FIG. 10. The processing of the flowchart in FIG. 10 is recurrently implemented, for example, every constant operation cycle while the computing processing unit 90 implements software (a program) stored in the storage apparatus 91.

Since the processing from the step S201 to the step S210 is the same as processing from the step S101 to the step S110 in FIG. 9 of Embodiment 1, explanation is omitted.

In the step S211 to the step S224, the final operating amount calculation unit 405B implements the operating amount limitation processing and the limit value forced switching processing according to the above-mentioned present embodiment. In the step S211, the final operating amount calculation unit 405B determines whether or not the supercharging state determining flag FA is set to 1 representing the supercharging driving state.

In the case where the supercharging state determining flag FA is set to 1 representing the supercharging driving state, the final operating amount calculation unit 405B advances to the step S212 and determines whether or not a limit value forced switching flag FB described below is set to 0. In the case where the limit value forced switching flag FB is set to 0 representing non-execution of the limit value forced switching processing, the final operating amount calculation unit 405B advances to the step S213 and sets the limit value LM to the first limit value L1; and in the case where the limit value forced switching flag FB is set to 1 representing execution of the limit value forced switching processing, the final operating amount calculation unit 405B advances to the step S214 and sets the limit value LM to the second limit value L2.

Then, in the step S215, the final operating amount calculation unit 405B determines whether or not the magnitude (absolute value) of the basic operating amount DT1 is larger than the limit value LM. In the case of determining that the magnitude is larger than the limit value LM, the final operating amount calculation unit 405B advances to the step S216, determines that the magnitude of the basic operating amount DT1 is upper-limited by the limit value LM, and increases a switching determination counter CT by one to measure a duration time of a state where the magnitude of the basic operating amount DT1 is upper-limited by the limit value LM. A value obtained by multiplying the calculation cycle to the switching determination counter CT corresponds to time. On the other hand, in the case of determining that the magnitude is not larger than the limit value LM, the final operating amount calculation unit 405B advances to the step S217, determines that the magnitude of the basic operating amount DT1 is not upper-limited by the first limit value L1, or is not upper-limited by the second limit value L2 forcibly switched, and resets the switching determination counter CT to 0.

Then, in the step S218, the final operating amount calculation unit 405B determines whether or not the switching determination counter CT is less than or equal to a preliminarily set switching determination value C1. In the case of determining that the switching determination counter CT is less than or equal to the switching determination value C1, the final operating amount calculation unit 405B advances to the step S219, determines that the state where the magnitude of the basic operating amount DT1 is upper-limited by the first limit value L1 does not continue more than the switching determination time, or that the magnitude of the basic operating amount DT1 is not upper-limited by the second limit value L2, and sets the limit value forced switching flag FB to 0 representing non-execution of the limit value forced switching processing. On the other hand, in the case of determining that the switching determination counter CT is not less than or equal to the switching determination value C1, the final operating amount calculation unit 405B advances to the step S220, determines that the state where the magnitude of the basic operating amount DT1 is upper-limited by the first limit value L1 continues greater than or equal to the switching determination time, and sets the limit value forced switching flag FB to 1 representing execution of the limit value forced switching processing.

On the other hand, in the case where the supercharging state determining flag FA is not set to 1 representing the supercharging driving state in the step S211, and it is determined that it is in the non-supercharging driving state, the final operating amount calculation unit 405B advances to the step S221, and sets the second limit value L2 to the limit value LM. Then, since the limit value forced switching processing is not implemented in the non-supercharging driving state, the final operating amount calculation unit 405B sets the switching determination counter CT to 0 in the step S222, and sets the limit value forced switching flag FB to 0 in the step S223.

Then, in the step S224, the final operating amount calculation unit 405B performs a minimum value picking (min) that picks out a smaller value between the basic operating amount DT1 and the positive limit value (+LM), performs a maximum value picking (max) that picks out a larger value between the picked minimum value and the negative limit value (−LM); and calculates the picked maximum value as the final operating amount DT2.

In the last step S225, the actuator driving unit 406 implements the valve driving processing (the valve driving step) that performs driving control of the electric valve actuator 34 based on the final operating amount DT2 calculated in the step S224.

Embodiment 3

Next, the controller 40 according to Embodiment 3 will be explained. The explanation for constituent parts the same as those in Embodiment 1 will be omitted. Although the basic configuration and processing of the internal combustion engine 10 and the controller 40 according to the present embodiment are the same as those of Embodiment 1, the operating amount limitation processing of the operating amount calculation unit 405 differs partially.

As is the case with Embodiment 1, the basic operating amount calculation unit 405A implements the basic operating amount calculation processing that calculates the basic operating amount DT1 for bringing the real opening degree close to the target opening degree. As is the case with Embodiment 1, the final operating amount calculation unit 405B implements the operating amount limitation processing that in the case of determining that it is in the supercharging driving state, calculates an operating amount obtained by performing upper limitation of the magnitude of the basic operating amount DT1 by the preliminarily set first limit value L1, as the final operating amount DT2; and in the case of determining that it is in the non-supercharging driving state, calculates an operating amount obtained by performing upper limitation of the magnitude of the basic operating amount DT1 by the second limit value L2 which is preliminarily set to a value smaller than the first limit value L1, as the final operating amount DT2.

Unlike Embodiment 1, when the operating position of the waste gate valve 31 is within a preliminarily set variation range of the fully closed position, and the basic operating amount DT1 which operates the waste gate valve 31 in the closing direction is calculated, the final operating amount calculation unit 405B implements the operating amount limitation processing that calculates an operating amount obtained by performing upper limitation of the magnitude of the basic operating amount DT1 of the closing direction by the first limit value L1 or the second limit value L2, as the final operating amount DT2; and otherwise, the final operating amount calculation unit 405B does not implement the operating amount limitation processing, and calculates the basic operating amount DT1 to the final operating amount DT2.

According to this configuration, when the waste gate valve 31 butts against the fully closed position and the electric valve actuator 34 is controlled in the closing direction, the operating amount can be limited and can be prevented from becoming excessive by the erroneous setting or the erroneous learning of the fully closed position. On the other hand, since otherwise the operating amount is not limited, the operating amount can be set to a large value, and the real opening degree can be brought close to the target opening degree with a good responsiveness. Even in the case where the operating position of the waste gate valve 31 is within the variation range of the fully closed position, since the operating amount is not limited when the electric valve actuator 34 is controlled in the opening direction, at the time of opening the waste gate valve 31 from the fully closed position, the waste gate valve 31 can be opened with a good responsiveness.

In the present embodiment, when the output voltage Vs of the valve position sensor 43 is within the variation range of the fully closed position, and the basic operating amount DT1 is smaller than 0, the final operating amount calculation unit 405B calculates an operating amount obtained by performing upper limitation of the magnitude of the basic operating amount DT1 of the closing direction by the first limit value L1 or the second limit value L2, as the final operating amount DT2; and otherwise, the final operating amount calculation unit 405B calculates the basic operating amount DT1, as the final operating amount DT2. As shown in FIG. 6, the variation range of the fully closed position is preliminarily set corresponding to the fluctuation range of the output voltage Vs of the valve position sensor 43 corresponding to the fully closed position, by factors, such as the deviation of the attachment position of the waste gate valve 31, the drift of the output voltage by the temperature characteristic of the valve position sensor 43, and the thermal expansion of turbocharger member.

<Flowchart>

The processing of each control units 400 through 406 and the like of the controller 40 according to Embodiment 3 can be configured such as the flowchart shown in FIG. 11. The processing of the flowchart in FIG. 11 is recurrently implemented, for example, every constant operation cycle while the computing processing unit 90 implements software (a program) stored in the storage apparatus 91.

Since the processing from the step S301 to the step S310 is the same as processing from the step S101 to the step S110 in FIG. 9 of Embodiment 1, explanation is omitted.

In the step S311 to the step S316, the final operating amount calculation unit 405B implements the operating amount limitation processing and the limit value forced switching processing according to the above-mentioned present embodiment. In the step S311, the final operating amount calculation unit 405B determines whether or not the operating position of the waste gate valve is within a preliminarily set variation range of the fully closed position, and the basic operating amount which operates the waste gate valve in a closing direction is calculated.

In the case of determining that the operating position is within the variation range of the fully closed position, and the basic operating amount DT1 of the closing direction is calculated in the step 311, the final operating amount calculation unit 405B advances to the step S312 and determines whether or not the supercharging state determining flag FA is set to 1 representing the supercharging driving state. In the case where the supercharging state determining flag FA is set to 1 representing the supercharging driving state, the final operating amount calculation unit 405B advances to the step S313 and sets a limit value LM to the first limit value L1; and in the case where the supercharging state determining flag FA is set to 0 representing the non-supercharging driving state, the final operating amount calculation unit 405B advances to the step S314 and sets the limit value LM to the second limit value L2. Then, in the step S315, the final operating amount calculation unit 405B performs a maximum value picking (max) that picks out a larger value between the basic operating amount DT1 and the negative limit value (−LM); and calculates the picked maximum value as the final operating amount DT2.

On the other hand, in the case of determining that the operating position is not within the variation range of the fully closed position, or the basic operating amount DT1 of the closing direction is not calculated in the step 311, the final operating amount calculation unit 405B advances to the step S316 and calculates the basic operating amount DT1 as the final operating amount DT2, without implementing the operating amount limitation processing.

In the last step S317, as described above, the actuator driving unit 406 implements the valve driving processing (the valve driving step) that performs driving control of the electric valve actuator 34 based on the final operating amount DT2 calculated in the step S315 or the step 316.

Other Embodiments

Lastly, other embodiments of the present invention will be explained. Each of the configurations of embodiments to be explained below is not limited to be separately utilized but can be utilized in combination with the configurations of other embodiments as long as no discrepancy occurs.

(1) In the above-mentioned Embodiments 1, 2, there has been explained the case where the operating amount calculation unit 405 calculates an operating amount obtained by performing upper limitation of the magnitude of the basic operating amount DT1 in both of the closing direction and the opening direction by the first limit value L1 or the second limit value L2, as the final operating amount DT2. However, embodiments of the present invention are not limited to the foregoing case. That is to say, the operating amount calculation unit 405 may perform upper limitation of the magnitude of the basic operating amount DT1 in only the closing direction by the first limit value L1 or the second limit value L2, or may perform upper limitation of the magnitude of the basic operating amount DT1 in only the opening direction by the first limit value L1 or the second limit value L2.

(2) In each of the foregoing embodiments, there has been explained the case where the operating amount in the closing direction becomes a negative value, and the operating amount in the opening direction becomes a positive value. However, embodiments of the present invention are not limited to the foregoing case. That is to say, the operating amount in the closing direction may become a positive value, and the operating amount in the opening direction may become a negative value.

(3) In the above-mentioned Embodiment 3, when the operating position of the waste gate valve 31 is within a preliminarily set variation range of the fully opened position, and the basic operating amount DT1 which operates the waste gate valve 31 in the opening direction is calculated, the final operating amount calculation unit 405B may implement the operating amount limitation processing that calculates an operating amount obtained by performing upper limitation of the magnitude of the basic operating amount DT1 of the opening direction by the first limit value L1 or the second limit value L2, as the final operating amount DT2; and otherwise, the final operating amount calculation unit 405B may not implement the operating amount limitation processing, and calculates the basic operating amount DT1 to the final operating amount DT2.

Various modifications and alterations of this invention will be apparent to those skilled in the art without departing from the scope and spirit of this invention, and it should be understood that this is not limited to the illustrative embodiments set forth herein.

What is claimed is:

1. A controller for an internal combustion engine that is provided with a turbocharger which has a turbine provided in an exhaust path, a compressor which is provided in an intake path and rotates integrally with the turbine, an exhaust gas bypass which communicates upstream side and downstream side of the turbine, a waste gate valve which adjusts flow rate of exhaust gas which flows through the exhaust gas bypass, and an electric valve actuator which changes an operating position of the waste gate valve, wherein the controller for the internal combustion engine is configured to:
   detect the operating position of the waste gate valve and a real supercharging pressure which is an actual value of a pressure of an intake air compressed by the compressor;
   determine whether the internal combustion engine is in a supercharging driving state where the real supercharging pressure is higher or expected to become higher than an atmospheric pressure, or whether the internal combustion engine is in a non-supercharging driving state where the real supercharging pressure is less than or equal to, or expected to become less than or equal to the atmospheric pressure;
   calculate a target opening degree of the waste gate valve;
   calculate a real opening degree of the waste gate valve based on the operating position of the waste gate valve;
   calculate a basic operating amount for bringing the real opening degree close to the target opening degree;
   if the internal combustion engine is in the supercharging driving state:
     set a negative first limit value as a final operating amount when the basic operating amount is smaller than the negative first limit value obtained by multiplying −1 to a first limit value which is preliminarily set to a positive value;
     set the first limit value as the final operating amount when the basic operating amount is larger than the first limit value; and
     set the basic operating amount as the final operating amount when the basic operating amount is within a range from the negative first limit value to the first limit value;
   if the internal combustion engine is in the non-supercharging driving state:
     set a negative second limit value as the final operating amount when the basic operating amount is smaller than the negative second limit value obtained by multiplying −1 to a second limit value which is preliminarily set to a positive value and is smaller than the first limit value, the controller;
     set the second limit value as the final operating amount when the basic operating amount is larger than the second limit value, the controller; and
     set the basic operating amount as the final operating amount when the basic operating amount is within a range from the negative second limit value to the second limit value; and
   perform driving control of the electric valve actuator based on the final operating amount.

2. The controller for the internal combustion engine according to claim 1, wherein the first limit value is preliminarily set to a value corresponding to a minimum operating amount which can maintain a state where the waste gate valve was pressed to a fully closed position against a pressure of the exhaust gas which acts on the waste gate valve, in a driving condition where the pressure of the exhaust gas at the upstream side of the turbine becomes maximum in the supercharging driving state, and
   wherein the second limit value is preliminarily set to a value corresponding to a minimum operating amount which can maintain a state where the waste gate valve was pressed to the fully closed position against the pressure of the exhaust gas which acts on the waste gate valve, in a driving condition where the pressure of the exhaust gas at the upstream side of the turbine becomes maximum in the non-supercharging driving state.

3. The controller for the internal combustion engine according to claim 1, wherein
   the controller calculates a target supercharging pressure which is a target value of the pressure of the intake air compressed by the compressor;
   if the internal combustion engine is in the supercharging driving state, the controller calculates an opening degree of the waste gate valve for bringing the real supercharging pressure close to the target supercharging pressure; and
   if the internal combustion engine is in the non-supercharging driving state, the controller calculates the opening degree of the waste gate valve which is preliminarily set for every driving condition of the non-supercharging driving state, as the target opening degree.

4. The controller for the internal combustion engine according to claim 1, wherein if the internal combustion engine is in the supercharging driving state, and when the negative first limit value is set to the final operating amount or when the first limit value is set to the final operating amount for more than a preliminarily set switching determination time, the controller is configured to:
   set the negative second limit value as the final operating amount when the basic operating amount is smaller than the negative second limit value;
   set the second limit value as the final operating amount when the basic operating amount is larger than the second limit value; and
   set the basic operating amount as the final operating amount when the basic operating amount is within a range from the negative second limit value to the second limit value.

5. The controller for the internal combustion engine according to claim 4, wherein if the internal combustion engine is in the supercharging driving state and the of the basic operating amount is within the range from the negative second limit value to the second limit value, the controller is configured to:
   set the negative first limit value as the final operating amount when the basic operating amount is smaller than the negative first limit value;

set the first limit value as the final operating amount when the basic operating amount is larger than the first limit value; and set the basic operating amount as the final operating amount when the basic operating amount is within the range from the negative first limit value to the first limit value.

6. A controller for an internal combustion engine that is provided with a turbocharger which has a turbine provided in an exhaust path, a compressor which is provided in an intake path and rotates integrally with the turbine, an exhaust gas bypass which communicates upstream side and downstream side of the turbine, a waste gate valve which adjusts flow rate of exhaust gas which flows through the exhaust gas bypass, and an electric valve actuator which changes an operating position of the waste gate valve, wherein the controller for the internal combustion engine is configured to:

detect the operating position of the waste gate valve, and a real supercharging pressure which is an actual value of a pressure of an intake air compressed by the compressor;

determine whether the internal combustion engine is in a supercharging driving state where the real supercharging pressure is higher or expected to become higher than an atmospheric pressure, or whether the internal combustion engine is in a non-supercharging driving state where the real supercharging pressure is less than or equal to, or expected to become less than or equal to the atmospheric pressure;

calculate a target opening degree of the waste gate valve;

calculate a real opening degree of the waste gate valve based on the operating position of the waste gate valve;

calculate a basic operating amount for bringing the real opening degree close to the target opening degree;

if the internal combustion engine is in the supercharging driving state:
set a negative first limit value to a final operating amount when the basic operating amount of a closing direction is smaller than the negative first limit value obtained by multiplying −1 to a first limit value which is preliminarily set to a positive value;

set the first limit value to the final operating amount when the basic operating amount of the closing direction is larger than the first limit value; and set the basic operating amount of the closing direction to the final operating amount when the basic operating amount of the closing direction is within a range from the negative first limit value to the first limit value, if the internal combustion engine is in the non-supercharging driving state:
set a negative second limit value to the final operating amount when the basic operating amount of the closing direction is smaller than the negative second limit value obtained by multiplying −1 to a second limit value which is preliminarily set to a positive value and is smaller than the first limit value;

set the second limit value to the final operating amount when the basic operating amount of the closing direction is larger than the second limit value; and set the basic operating amount of the closing direction to the final operating amount when the basic operating amount of the closing direction is within a range from the negative second limit value to the second limit value; and perform driving control of the electric valve actuator based on the final operating amount.

7. A control method for an internal combustion engine that is provided with a turbocharger which has a turbine provided in an exhaust path, a compressor which is provided in an intake path and rotates integrally with the turbine, an exhaust gas bypass which communicates upstream side and downstream side of the turbine, a waste gate valve which adjusts flow rate of exhaust gas which flows through the exhaust gas bypass, and an electric valve actuator which changes an operating position of the waste gate valve, the control method for the internal combustion engine comprising:

detecting a driving condition, determining the operating position of the waste gate valve, and determining a real supercharging pressure which is an actual value of a pressure of an intake air compressed by the compressor, determining whether the internal combustion engine is in a supercharging driving state whether the real supercharging pressure is higher or expected to become higher than an atmospheric pressure, or whether the internal combustion engine is in a non-supercharging driving state where the real supercharging pressure is less than or equal to, or expected to become less than or equal to the atmospheric pressure;

calculating a target opening degree of the waste gate valve;

calculating a real opening degree of the waste gate valve based on the operating position of the waste gate valve;

calculating a basic operating amount for bringing the real opening degree close to the target opening degree;

setting a limit value equal to a first limit value which is a positive number if the internal combustion engine is in the supercharging driving state;

setting the limit value equal to a second limit value which is a positive number if the internal combustion engine is in the non-supercharging driving state-;

calculating a final operating amount b determining a minimum value by selecting a smaller of the basic operating amount and the limit value, by determining a maximum value by selecting a larger of the minimum value and a negative limit value, and setting the maximum value as the final operating amount; and controlling the electric valve actuator based on the final operating amount.

* * * * *